US011080262B1

(12) United States Patent
Levandoski et al.

(10) Patent No.: US 11,080,262 B1
(45) Date of Patent: Aug. 3, 2021

(54) OPTIMISTIC ATOMIC MULTI-PAGE WRITE OPERATIONS IN DECOUPLED MULTI-WRITER DATABASES

(71) Applicant: Amazon Technologies, Inc., Seattle, WA (US)

(72) Inventors: Justin Levandoski, Seattle, WA (US); Niket Goel, Seattle, WA (US); Tengiz Kharatishvili, Sammamish, WA (US); Alexandre Olegovich Verbitski, Woodinville, WA (US); Kamal Kant Gupta, Belmont, CA (US); Xiaofeng Bao, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 124 days.

(21) Appl. No.: 16/586,497

(22) Filed: Sep. 27, 2019

(51) Int. Cl.
*G06F 16/23* (2019.01)
*G06F 16/22* (2019.01)
*G06F 16/2455* (2019.01)

(52) U.S. Cl.
CPC ...... *G06F 16/2343* (2019.01); *G06F 16/2282* (2019.01); *G06F 16/24552* (2019.01)

(58) Field of Classification Search
CPC .. G06F 16/2343; G06F 16/2358; G06F 16/23; G06F 16/2282; G06F 16/24552; G06F 2201/87; G06F 9/466
See application file for complete search history.

(56) References Cited

U.S. PATENT DOCUMENTS

| | | | | |
|---|---|---|---|---|
| 5,197,148 A | * | 3/1993 | Blount | G06F 9/466 700/79 |
| 6,772,154 B1 | * | 8/2004 | Daynes | G06F 16/2343 |
| 7,266,702 B2 | | 9/2007 | Hotti | |
| 7,620,659 B2 | | 11/2009 | Novik et al. | |
| 7,707,219 B1 | * | 4/2010 | Bruso | G06F 16/2379 707/758 |
| 8,504,542 B2 | * | 8/2013 | Chang | G06F 16/2336 707/704 |

(Continued)

OTHER PUBLICATIONS

U.S. Appl. No. 16/586,563, filed Sep. 27, 2019, Tengiz Kharatishvili.

(Continued)

*Primary Examiner* — Merilyn P Nguyen
(74) *Attorney, Agent, or Firm* — Robert C. Kowert; Kowert, Hood, Munyon, Rankin & Goetzel, P.C.

(57) ABSTRACT

Systems and methods are disclosed to implement, in a database system, database engine nodes that implement multi-page writes as an atomic operation. In embodiments, the database system may include multiple database engine nodes that optimistically perform page writes locally without checking for potential conflicts at a shared storage system. The storage system will detect and report conflicting writes on a single page. To ensure that a group of writes to multiple pages occur atomically, the database engine node maintains a transaction context for the group, so that if a page conflict is later detected for any write in the group, the entire group will be rolled back at the database engine node and the storage system. In embodiments, the transaction context will track subsequent writes generated by the node to any page written by the group, so that these subsequent writes are also rolled back with the group.

20 Claims, 12 Drawing Sheets

(56) References Cited

U.S. PATENT DOCUMENTS

| | | |
|---|---|---|
| 8,909,610 B2 | 12/2014 | Reid et al. |
| 9,336,258 B2 * | 5/2016 | Bhattacharjee ..... G06F 16/2343 |
| 9,613,078 B2 | 4/2017 | Vermeulen et al. |
| 9,665,609 B2 | 5/2017 | Andrei et al. |
| 10,127,260 B2 | 11/2018 | Goel et al. |
| 2004/0177100 A1 | 9/2004 | Bjorner et al. |
| 2006/0004885 A1 | 1/2006 | Lubashev et al. |
| 2011/0029490 A1 | 2/2011 | Agarwal et al. |
| 2016/0357791 A1 * | 12/2016 | Levandoski ........ G06F 12/1009 |
| 2018/0011893 A1 * | 1/2018 | Kimura ............... G06F 16/9027 |
| 2019/0324673 A1 * | 10/2019 | Graefe ................ G06F 16/2343 |

OTHER PUBLICATIONS

U.S. Appl. No. 16/586,355, filed Sep. 27, 2019, Tengiz Kharatishvili.
U.S. Appl. No. 16/586,235, filed Sep. 27, 2019, Tengiz Kharatishvili.

* cited by examiner

OPTIMISTIC ATOMIC MULTI-PAGE WRITE OPERATIONS IN DECOUPLED MULTI-WRITER DATABASES

BACKGROUND

Implementing computing systems that manage large quantities of data and/or service large numbers of users often presents problems of scale. As demand for various types of computing services grows, it may become difficult to service that demand without increasing the available computing resources accordingly. To facilitate scaling to meet demand, many computing-related systems or services are implemented as distributed applications, each application being executed on a number of computer hardware servers. For example, a number of different software processes executing on different computer systems may operate cooperatively to implement a computing service. When more service capacity is needed, additional hardware or software resources may be deployed to increase the availability of the computing service.

While adding additional computing resources can facilitate application scaling, doing so significantly increases the complexity of the distributed system when performing various operations. For example, a database hosted at a distributed system or application may allow multiple different processes implemented at separate computer systems to perform writes to the database. Because multiple writers can write to the database, distributed concurrency techniques are needed to ensure that writes are consistently performed across the distributed system, without violating the various consistency requirements of the database system.

Figure 1:
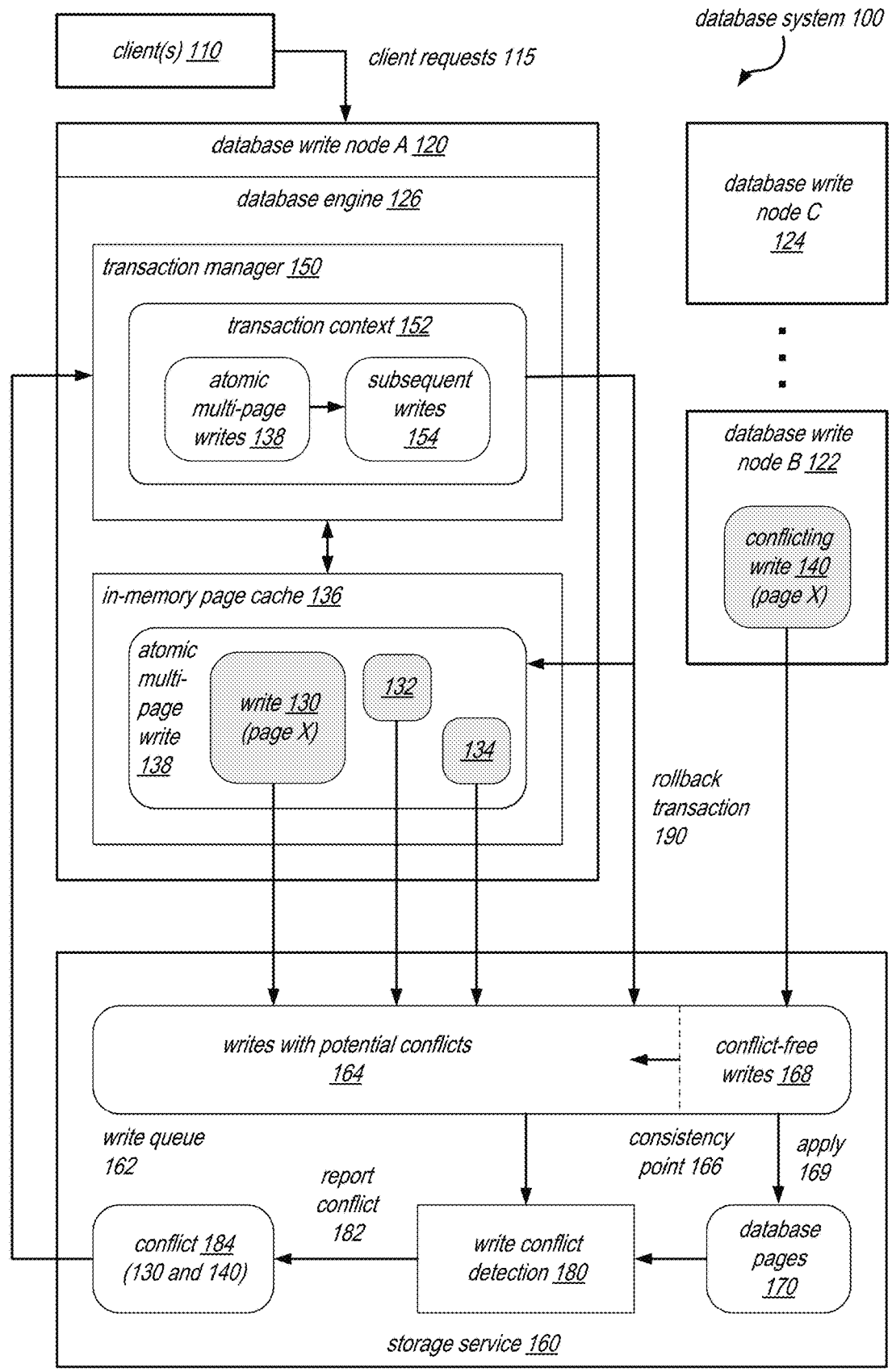
FIG. 1 is a block diagram illustrating an example optimistic multi-writer database that implements optimistic atomic multi-page write operations, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement a multi-writer database system that implements optimistic atomic multi-page write operations, according to some embodiments.

Database system may be implemented in a multi-master or multi-writer scheme, where multiple database engine nodes are able to generate write operations to a shared storage layer of the database. In some embodiments, such multi-writer database systems may be implemented in a decoupled architecture, where the individual database nodes operate independently to submit writes to the shared storage layer. In embodiments of such database systems, two writes from two different database nodes that update the same version of database page may be deemed to be conflicting writes at the storage layer, where only one of the two writes can succeed. To deal with such conflicts, the storage layer may serve as the arbiter of conflicts and report the conflicts and/or conflict resolutions to the database nodes. For example, the storage layer may resolve the conflicts based on which update obtains a quorum acknowledgment from a group of storage nodes. However, the database node will not know the status of its writes (accepted or rejected) until it receives a notification from the storage layer. Thus, under a "pessimistic" approach, committing the write operation requires an additional network round trip between the database node and the storage layer. Additionally, the write operation needs to wait for the time required for the storage layer to quorum resolve updates. Such an approach results in poor performance for writes in large-scale databases systems.

To improve performance, some embodiments of multi-writer database systems may generate write operations optimistically. That is, the multi-writer database will not use a global pessimistic protocol whereby writers must first reserve exclusive access to a piece of data before performing a write, or otherwise confirm that the write is conflict-free. Rather, database nodes may apply the write locally and send the write to shared storage, assuming that the write will be successful and that no other potentially conflicting writes exist in the system. Under this optimistic approach, high performance of writes may be achieved when workloads perfectly partition and do not naturally conflict.

One challenge in a multi-write database system using optimistic writes relates to the handling of multi-page updates that must be performed atomically. In some embodiments, these types of multi-page writes are performed as part of system transactions, which atomically modify multiple pages of an internal database data structure but do not necessarily determine the fate of user-visible transactions. An example of such system transaction is a B-tree split that modifies at least three pages: (1) creation of a new page, (2) moving half of the records from the "split" page to the new page, and (3) updating the parent page with a search key and pointer to the new page to maintain logarithmic search properties. In some embodiments, B-trees may include dual sibling pointers at each level of the B-tree, so that a node will point to both its left and right sibling. In this case, an additional update is needed to change the back pointer of the right sibling of the newly created page. In some embodiments, to implement a multi-page split operation, or other types of atomic multi-page update operations, the database system will hold exclusive latches or locks on the multiple pages undergoing modification. Once the operation is complete, the latches or locks are released.

However, in a multi-writer database system with optimistic database write nodes, the database write nodes do not acquire global latches or locks before performing the multiple writes. As discussed, in optimistic write nodes, a write to any page in an atomic multi-page write operation may be retroactively determined to conflict with a write from another write node. Thus, a mechanism is needed to ensure that the atomic multi-page write operation is handled correctly under the possibility of such later discovered write conflicts.

One possible solution to this problem is to implement the atomic write operations pessimistically. That is, the database write node may wait synchronously while holding global latches or locks in order for the storage layer to resolve the fate of all writes. If any of the writes are rejected by storage, the database node can safely roll back the pages to a state prior to the atomic operation, since holding the page latches or locks guarantees no other operation in the database could have observed intermediate state. This solution, however, reduces performance significantly. Page latches or locks are held across a round trip network trip to storage in addition to the time it takes to quorum-resolve all updates. During this time, no concurrent database threads can read nor update these pages. Such a solution is not practical for many large-scale databases.

Accordingly, embodiments of a multi-writer database are described herein to implement optimistic atomic multi-page write operations, according to some embodiments. In some embodiments, the database write node performs multiple write operations on multiple pages optimistically, and assume that the operations will not conflict with writes from other write nodes. However, the database write node maintains a transaction for the write operations, so that if a conflict is later detected, for example, by the storage layer, the entire multi-page write operation is rolled back to a state prior to the conflict, according to the transaction information. This optimistic approach allows higher concurrency on the database writer node since all exclusive latches or locks are released immediately after the operation completes in the memory of the database writer node.

In some embodiments, the rollback is performed retroactively by the database writer node on the conflicted multi-page atomic operation, along with all dependent operations. By being optimistic, this approach allows subsequent operations on the pages "in limbo" undergoing asynchronous resolution. In some embodiments, these dependent operations can include not only writes within the original atomic multi-page write operation, but also other atomic multi-page operations pending on the node. If the original atomic operation fails, all dependent atomic multi-page write operations are also rolled back.

In some embodiments of the multi-writer database system, all updates to pages are tracked using a unique identifier (a log sequence number or LSN) that is unique across the entire cluster of writer node. At any point in time, a writer node knows all LSNs that it generated that are uncommitted and in flight, and also tracks the dependency chain for the LSN. That is, for each LSN for a write, the writer node knows the previous LSN that the LSN wrote on top of, and the next LSN, if any, that wrote on top of LSN. A multi-page atomic operation may include multiple LSNs that span multiple pages. In some embodiments, during the pendency of an optimistic multi-page write operation, the write node will maintain a context containing enough information to roll back modifications made to all pages.

In some embodiments, the database write node may implement a protocol to synchronize multi-writer updates to avoid corrupting database state due to optimistic multi-page atomic operations. In some embodiments of the multi-writer database system, since a database write node may store "in-limbo" updates to pages awaiting resolution, the write nodes may collectively implement a protocol to guard against the possibility that page updates from another node do not overwrite its own pages in an inconsistent manner. In some embodiments, page updates may propagate to a write node by (1) the write node reading a recently updated page from shared storage or (2) the write node directly replicating the update from another write node. In some embodiments, before any of these actions, some "in-limbo" multi-page write operations at the write node will be rollback back. In particular, any in-limbo multi-operation that contains a conflict with such an action will be rolled back before the action is performed on the page state of the write node.

Advantageously, embodiments of the optimistic multi-writer database system described herein improve the functioning of database systems to provide a number of technical benefits to these database systems. In one respect, the disclosed atomic multi-page write operations allow the multi-write database to perform writes optimistically, without having to check for write conflicts on individual pages before performing the writes locally. As discussed, this optimistic approach significantly improves the performance of the database system.

In another respect, the atomic multi-page write operations allow a group of related page write operations to be performed or rolled back as an atomic unit, so that the group of page writes are performed entirely or not at all. These sorts of atomic multi-page write operations are useful to implement many types of system transaction in the database system, for example, to perform a page split operation in an index object.

In another respect, the disclosed atomic multi-page write operation may be easily implemented on top of a storage system that only implements conflict detection for a single page. The disclosed atomic multi-page write operation may be easily implemented at the database write nodes, by adding functionality at the nodes to maintain a transaction context for pending atomic multi-page write operations. Accordingly, the atomic multi-page write operations can be designed to work with the single-page conflict detection functionality of the storage system, and can be implemented without requiring substantial changes to the core functionality of the storage system.

In yet another respect, the disclosed atomic multi-page write operation features do not add significant burdens to the operations of the multi-writer database system. As discussed, the atomic multi-page write operations can be at the database write node level. In some embodiments, the transaction contexts that are to be maintained for the multi-page wirte operations may be implemented on top of existing metadata already maintained as part of the memory state of the write node, which may, for example, already maintain a write history for each page cached by the write node. Accordingly, the transaction context data structure may simply refer to particular pages or write LSNs maintained with the node's existing metadata. When all writes in the atomic multi-write operation are confirmed to be accepted by the storage system, the transaction context may be discarded. Because the write transactions will generally have short lifespans on the write node, their use will not cause significant performance impacts on the database system as a whole. These and other features and benefits of the atomic multi-page write operation features are described in further detail below, in connection with the figures.

FIG. 1 is a block diagram illustrating an example optimistic multi-writer database that implements optimistic atomic multi-page write operations, according to some embodiments.

As shown, the depicted database system 100 is implemented using a number of database write nodes, including node A 120, node B 122, and node C 124. In some embodiments, each of these database nodes 120, 122, and 124 may implement a database engine 126 of the database system. For example, in some embodiments, the database engine 126 may implement components to write and query data in the database. In some embodiments, the database may be a Structured Query Language (SQL) database that organizes its data in tables. In some embodiments, the database may be a non-SQL database. As shown, each database write node may be used to independently service client requests 115 from clients 110. In some embodiments, the database write nodes may interact directly with the clients 110. In some embodiments, the database write nodes may be implemented behind a client-facing endpoint, request router, or load balancer, so that they interact with the clients 110 through the particular frontend component.

As shown, in the depicted example, the database 100 also includes a storage service 160, which is shared among the database write nodes A, B, and C. In some embodiments, the storage service 160 may be a log-structured storage service that maintains a database log which logs the write operations sent by the database write nodes. As shown, in some embodiments, the received write operations may be queued in sequence, in a write queue 162. In some embodiments, after a contiguous sequence of write operations are verified to be conflict free, the write operations may be logged into the database log and may be considered durable in the database. The storage service 160 may then apply 169 the logged write operations in sequence order, to the database pages 170 of the database. The database pages 170 may store the data of the database in a more organized order (e.g., in tables and in individual records), so that they can be easily fetched in response to queries handled by the database nodes. In some embodiments, the backend storage of the database 100 may not be log-based. In some embodiments, the backend storage of the database 100 may not be implemented as a storage service. For example, in some embodiments, the backend storage may simply be a shared storage volume that provides a storage call interface to the database nodes. However, in some embodiments, the backend storage may be implemented as an independently running service, which may include a large fleet of auto-scaled nodes with associated storage devices. In some embodiments, the storage nodes and storage devices of the storage service 160 may be divided over multiple geographical area of availability zones, so that data in the database can be partitioned or replicated across the different areas or zones to improve database performance and/or availability.

In some embodiments, the database write nodes A, B, and C, may be implemented in a decoupled or loosely coupled scheme, so that before the nodes apply writes (e.g. page writes) locally (e.g. to a page cache at the node) and send write requests to the storage service 160, they do not first coordinate among one another to check for write conflicts. That is, the database write nodes may apply the writes and send the writes to the storage service 160 optimistically, assuming that the writes do not cause any page conflicts. In some embodiments, a page write operation on a page will assume a previous state of the page, which may be cached at individual ones of the writer nodes. In some embodiments, the cached states on each of the writer nodes may be slightly different. In some embodiments, the correctness of the database 100 requires all page writes in the database to be serializable to a global sequence of write operations. Accordingly, in some embodiments, two page writes may constitute a conflict if they concurrently update the same version of the same page. In the case of such page conflicts, only one of the two write operations will be allowed to proceed at the storage service 160, and the other one will be rejected to be retried later.

In some embodiments, the storage service 160 may be configured to detect these page conflicts. For example, as shown, the storage service 160 may implement database write queue 162 that includes a set of operations with potential conflicts 164, and a set of conflict-free operations 168. The storage service 160 may gradually check operations in the set 164 and move those operations without page conflicts to the set 168. In some embodiments, the sets 164 and 168 may be two different queues. In some embodiments, the set 168 may be implemented as the database log. In some embodiments, the checking of conflicts may be performed by a write conflict detection component 180, as shown. In some embodiments, the conflict detection component may check each operation to ensure that its expected state of the page being updated matches the latest state of the page as known to the storage service. If not, this means that an intervening operation has modified the page before the new operation, and the new operation must be rejected. In some embodiments, the rejection may be reported to the database node that issued the rejected write, which may cause that database node to refresh (e.g. fetch) the current version of the page from the storage service.

As shown, in some embodiments, the dividing line between the conflict-free operations 168 and the operations with potential conflicts 164 may be a consistency point 166 of the database. In some embodiments, page writes after this consistency point may be guaranteed by the storage service to be conflict free across all of the database writer nodes. Thus, LSNs after the consistency point 166 becomes a part of the official history of the database and eventually applied to the database pages 170. In some embodiments, page writes or LSNs in the set 168 may be guaranteed to be durable. It is noted that although the figure shows the database log 162 to be a single data structure, in some embodiments, the operations may be stored in other types of data structures, for example, a series of separate queues implemented by the storage service.

Although the storage service 160 may be configured to detect and report page conflicts on the same page or storage location, as discussed, the storage service 160 is not configured to recognize higher level system transactions, such as groups of multiple page writes that must occur as an atomic unit. Such system transaction may be used, for example, to atomically update multiple database pages to perform an index tree split. In this situation, the storage service 160 is also not in a good position to detect and report entire groups of write operations that should be rolled back as the result of a conflict, because the storage service is designed to only operate at the storage level, without any knowledge of application-specific constraints. Accordingly, in some embodiments of the database 100, the database writer nodes will themselves maintain a transaction to manage the atomic group of writes sent to the storage service 160, and to ensure their own consistent page states.

As shown, in the illustrated example, database node A 120 may implement an in-memory page cache 136. In some embodiments, the page cache may represent an in-memory data structure that contains a subset of pages of the database. As discussed, the database write nodes may be optimistic, so that writes to the pages in their own local cache may be performed without checking for conflicts with other nodes, or waiting for a report of conflict from the storage service. Accordingly, the state of the page cache 136 may be different from one write node to another, in the same database. In some embodiments, this inconsistency may be temporarily visible to clients 110 of the database system, depending on the database node that they are connected to.

As shown, the database write node 120 may implement an atomic multi-page write operation 138, which includes a number of writes 130, 132, and 134 to different pages. In this example, write 130 updates page X in the cached state of the node 120. Writes 132 and 134 may update other pages. In some embodiments, the database write node 120 may recognize that operations 130, 132, and 134 constitute a group of writes that belong to a single system transaction, or belong to a group of writes that must be performed as an atomic unit. Thus, writes 130, 132, and 134 must all succeed at a single logical point in time, or all fail collectively. In some embodiments, within the node 120, the updating of the cache 136 may be performed atomically by locking those pages in the cache before the writes. In this manner, no competing processes or threads (e.g. from different clients) updating the cache can cause a conflict with the multi-page write 138 at the node level. However, as discussed, this does not mean that the atomic multi-page write 138 has no conflict globally, across all of the write nodes. Again, this is because the write nodes all perform write operations optimistically, and they may not detect a conflict until that conflict is reported by the storage service 160, or via some other mechanism (e.g. a cross-node replication request).

Because of the possibility of a conflict from another write node, the database write node 120 in this example will maintain a transaction, using a transaction manager 150, as shown. In some embodiments, the transaction manager 150 will maintain a data structure, for example, transaction context 152, for each pending transaction initiated by the node 120. In some embodiments, a transaction is pending if it is reflected in the node's cache state, but not yet confirmed to be conflict-free globally in the database system. In this "limbo" state, the transaction manager will maintain enough information, via the transaction context 152, to allow the entire transaction, including all of the writes in the atomic multi-page write 138, to be retroactively rolled back, if a conflict is later detected. In some embodiments, once all writes in an atomic multi-page write operation is confirmed to be conflict-free (e.g. via notification from the storage service 160), the transaction (including the transaction context) will be discarded, so that the transaction is no longer pending.

In some embodiments, as shown, the transaction context 152 may maintain or identify not just the writes in the atomic multi-page write group 138, but also certain subsequent writes 154 that occur on the node 120 after the atomic multi-page write 138. In particular, in some embodiments, all database writes to a page assume and build on the sequence of previous writes to that page. In some embodiments, each page may be associated with a write chain of previous write operations on that page. In such embodiments, if a previous write to a page is invalidated (e.g. rolled back), all subsequent writes for that page on the write chain must also be invalidated. Accordingly, in some embodiments, the rollback operation will undo not just all operations in the atomic multi-page write group 138 itself, but also all subsequent writes to any page written by the atomic multi-page write. In some embodiments, once a transaction is initiated, the transaction manager 150 will continue to track all writes generated by the node 120, and add any subsequent writes 154 to the transaction context 152, as appropriate.

As shown, in this example, all writes in the atomic multi-page write operation 138 are sent to the storage service 160 and added to the write queue 162. As shown, in this example, another database writer node B 122 has previously generated a conflicting write 140, which writes to the same page X as write 130. Because writes 130 and 140 are not aware of one another, they are not serializable to produce two successive states of the same page (page X). As discussed, in some embodiments, the database system considers these two writes to be in conflict. Accordingly, at some point, the write conflict detection component 180 detects and reports 182 a conflict 184. As shown, the conflict 184 indicates that a page conflict exists between write operations 130 (from node A) and 140 (from node B).

In some embodiments, the page conflict 184 may be reported back to both of the database engine nodes that are involved in the conflict (here database write nodes A 120 and B 122). In some embodiments, the reported conflict 184 may be the result of conflict detection performed at the storage layer, which may also resolve the conflict, for example, by using a quorum-based conflict resolution protocol. In some embodiments, the storage layer may indicate to the database engine nodes whether its writes are accepted or rejected, so that the database engine nodes can update its cache state accordingly, and possibly take additional actions to rollback and/or retry rejected writes.

If it is determined that the write 130 is to be cancelled in favor of write 140, node A 120 will ensure, via the transaction manager 150, to rollback 190 the transaction completely, to a consistent state of the page state before the atomic multi-page write operation 138. In some embodiments, the rollback process may be performed using the transaction context data structure 152, which identifies all page writes that are to be undone during the rollback operation. As discussed, these page writes may include not just the page write in the atomic multi-page write operation itself, but also subsequent writes to all affected pages of the atomic operation.

In some embodiments, the rollback process 190 may involve two steps. First, the in-memory page cache 136 may be updated to undo all of the writes identified in the transaction context. The page cache may be updated atomically, for example, by locking or latching all identified pages, so that the update appears to occur at a single logical point in time to other competing processes on the node 120. Second, the transaction manager 150 may send one or more requests to the storage service 160 to cancel all of the writes identified in the transaction context. In some embodiments, the storage service 160 may provide a programmatic interface for these requests. In some embodiments, the storage service 160 may handle these requests atomically, so that all of the requested cancellations are performed in a single logical point in time, in an all-or-nothing fashion.

In some embodiments, depending on the reason for the rollback 190, the database write node 120 may also perform the "winning" write that caused the atomic multi-page write operation to fail. In this example, the winning write may be the conflicting write 140 from node B. Accordingly, the page cache 136 of node A will be updated to reflect write 140. In some embodiments, the winning write 140 may be indicated to node A 120 via the conflict 184 reported by the storage service. In some embodiments, the winning write 140 may be conveyed to node A 120 via a replication request from node B 122. In any event, the atomic multi-page write operation 138 will be completely rolled back by node A, before applying the winning write 140 from node B.

Figure 2:
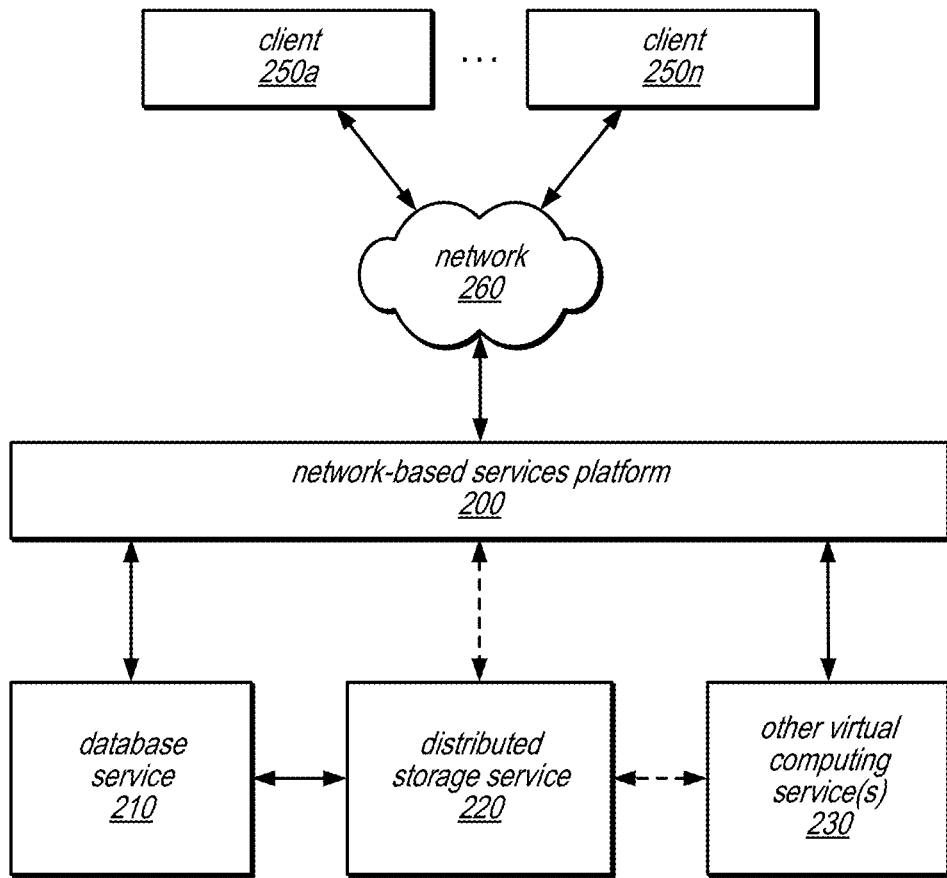
FIG. 2 is a block diagram illustrating a service system architecture that implement a database service that implements a multi-writer database with optimistic atomic multi-page write operations, according to some embodiments.

FIG. 2 is a block diagram illustrating a service system architecture that implement a database service that implements a multi-writer database with optimistic atomic multi-page write operations, according to some embodiments. In some embodiments, the clients 250 may be the clients 110 of FIG. 1, the database service 210 may implement the database system 100 of FIG. 1, and the distributed storage service 220 may be the storage service 160 of FIG. 1.

In the illustrated embodiment, a number of clients (shown as clients 250a-250n) interact with a web services platform 200 via a network 260. Web services platform 200 may interface with one or more instances of a database service 210, a storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 1000 embodiment illustrated in FIG. 12 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit web services requests to web services platform 200 via network 260, including requests for database services (e.g., a request to generate a snapshot, etc.). For example, a given client 250 may include a suitable version of a web browser, or may include a plug-in module or other type of code module that may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application that interacts directly with web services platform 200. In some embodiments, client 250 may generate web services requests according to a Representational State Transfer (REST)-style web services architecture, a document- or message-based web services architecture, or another suitable web services architecture.

In some embodiments, a client 250 (e.g., a database service client) may provide access to web services-based storage of databases to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of any particular storage system service model. In some embodiments, the details of interfacing to Web services platform 200 may be coordinated by client 250 and the operating system or file system on behalf of applications executing within the operating system environment.

Clients 250 may convey web services requests (e.g., a snapshot request, parameters of a snapshot request, read request, restore a snapshot, query, write, etc.) to and receive responses from web services platform 200 via network 260. In various embodiments, network 260 may encompass any suitable combination of networking hardware and protocols necessary to establish web-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and web services platform 200. It is noted that in some embodiments, clients 250 may communicate with web services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, web services platform 200 may implement one or more service endpoints to receive and process web services requests, such as requests to access data pages (or records thereof). For example, web services platform 200 may include hardware and/or software to implement a particular endpoint, such that an HTTP-based web services request directed to that endpoint is properly received and processed. In one embodiment, web services platform 200 may be implemented as a server system to receive web services requests from clients 250 and to forward them to components of a system that implements database service 210, distributed storage service 220 and/or another virtual computing service 230 for processing. In other embodiments, web services platform 200 may be implemented as a number of distinct systems (e.g., in a cluster topology) implementing load balancing and other request management features to dynamically manage large-scale web services request processing loads. In various embodiments, web services platform 200 may support REST-style or document-based (e.g., SOAP-based) types of web services requests.

In addition to functioning as an addressable endpoint for clients' web services requests, in some embodiments, web services platform 200 may implement various client management features. For example, platform 200 may coordinate the metering and accounting of client usage of web services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, the platform 200 may also implement user authentication and access control procedures. For example, for a given web services request to access a particular database, platform 200 may ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding web services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent one interface through which clients 250 may access the features of a database system that implements database service 210, it need not represent the sole interface to such features. For example, an alternate API that may be distinct from a web services interface may be used to allow clients internal to the enterprise providing the database system to bypass web services platform 200. Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network, shown as the solid line between storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through web services platform 200 to provide storage of databases or other information for applications other than those that rely on database service 210 for database management. This is illustrated in FIG. 2 by the dashed line between web services platform 200 and distributed storage service 220. In such embodiments, clients of the distributed storage service 220 may access distributed storage service 220 via network 260 (e.g., over the Internet). In some embodiments, a virtual computing service 230 may receive storage services from distributed storage service 220 (e.g., through an API directly between the virtual computing service 230 and storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Figure 3:
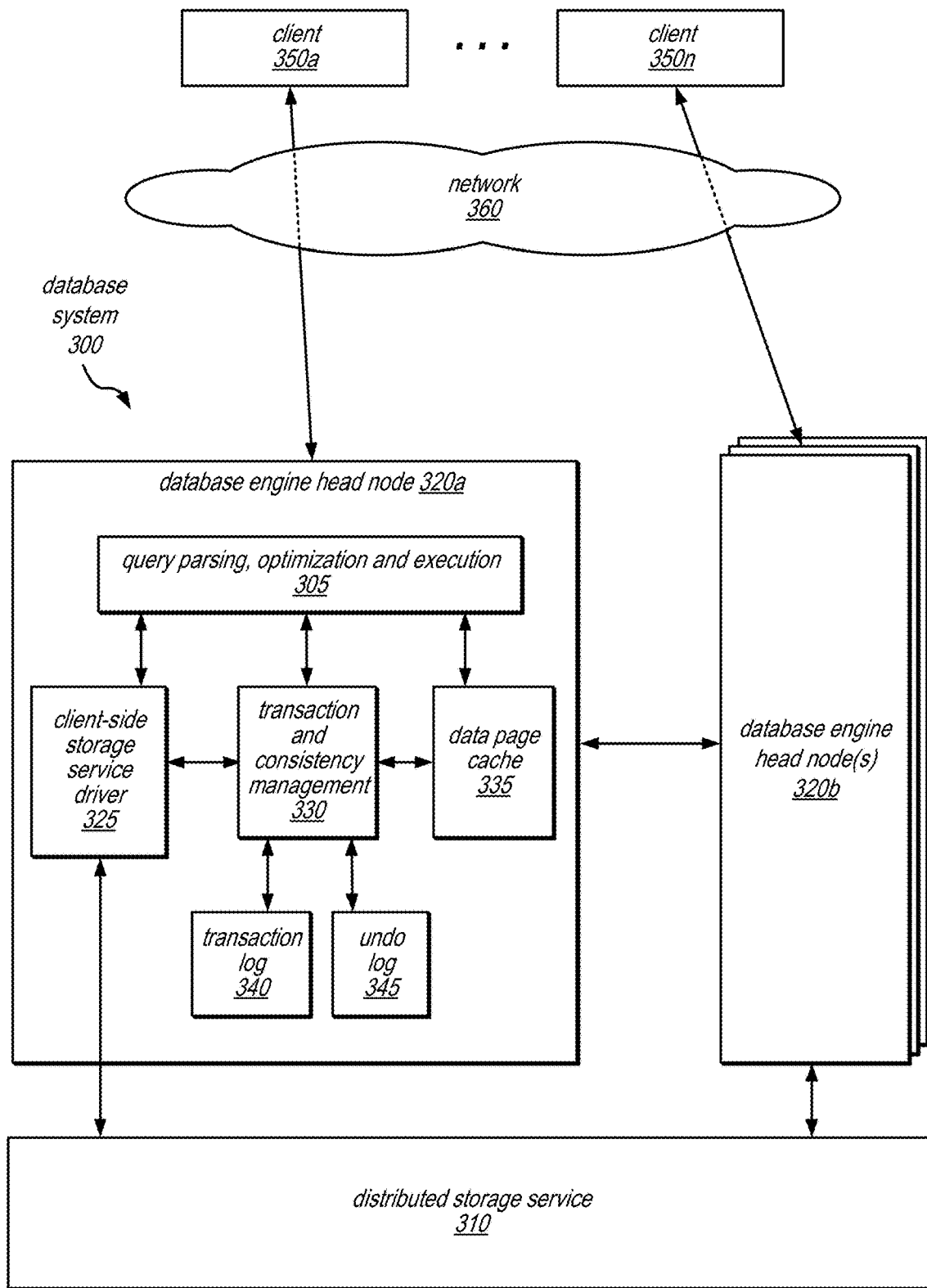
FIG. 3 is a block diagram illustrating various components of the database write node in a multi-writer database that implements optimistic atomic multi-page write operations, according to some embodiments.

FIG. 3 is a block diagram illustrating various components of the database write node in a multi-writer database that implements optimistic atomic multi-page write operations, according to some embodiments. In some embodiments, the database system 300 may be the database system 100 of FIG. 1, the database engine head nodes 320a and 320b may be implemented using the database write nodes 120, 122, and 124 of FIG. 1, and the distributed storage service 310 may be the storage service 160 of FIG. 1.

As shown, database system 300 includes one or multiple respective database engine head nodes 320 for each of several databases and a storage service 310 (which may or may not be visible to the clients of the database system, shown as clients 350a-350n). For example, database engine head node 320a may serve as an access point for providing read and write access to a database. As illustrated in this example, one or more of clients 350a-350n may access a database head node 320 via network 360 (e.g., these components may be network-addressable and accessible to the clients 350a-350n). However, storage service 310, which may be employed by the database system to store data pages of one or more databases (and redo log records and/or other metadata associated therewith) on behalf of clients 350a-350n, and to perform other functions of the database system as described herein, may or may not be network-addressable and accessible to the clients 350a-350n, in different embodiments. For example, in some embodiments, distributed storage service 310 may perform various storage, access, change logging, recovery, log record manipulation, and/or space management operations in a manner that is invisible to clients 350a-350n.

As previously noted, each database instance may include multiple database engine head nodes 320 that receives requests (e.g., requests that cause writes such as update or insert requests, etc.) from various client programs (e.g., applications) and/or subscribers (users), then parses them, optimizes them, and develops a plan to carry out the associated database operation(s). In this example, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a).

In this example, database engine head node 320a includes a data page cache 335, in which data pages that were recently accessed may be temporarily held. As shown, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance, such as applying undo log records to generate prior versions of tuples of a database in order to roll back changes not visible for performing a query. As shown, database engine head node 320a may also include a transaction log 340 and an undo log 345, which may be employed by transaction and consistency management component 330 to track the status of various transactions and roll back any results of transactions that do not commit.

Note that each of the other database engine head nodes 320 illustrated in this figure (e.g., 320a and 320b) may include similar components and may perform similar functions for queries received by one or more of clients 350a-350n and directed to the respective database instances of which it is a component.

In some embodiments, the storage systems described herein may organize data in various logical volumes, segments, and pages for storage on one or more storage nodes. For example, in some embodiments, each database may be represented by a logical volume, and each logical volume may be segmented over a collection of storage nodes. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. As described in detail herein, the storage nodes may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the database is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on a storage device; rather there may be an allocation map in each storage device describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of memory, generally of fixed size. In some embodiments, each page may be a block of memory (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, a log page may be a type of page that is used to store log records (e.g., redo log records or undo log records). In some embodiments, log pages may be identical in size to storage pages. Each log page may include a header containing metadata about that log page, e.g., metadata identifying the segment to which it belongs, in some embodiments. Note that a log page may be a unit of organization and may not necessarily be the unit of data included in write operations, in some embodiments. For example, in some embodiments, during normal forward processing, write operations may write to the tail of the log one sector at a time.

In some embodiments, log records (e.g., the individual elements of a log page) may be of several different classes. For example, user log records (ULRs), may be created and understood by users/clients/applications of the storage system, and may be used to indicate changes to user data in a volume, in some embodiments. Control log records (CLRs), may be generated by the storage system and may contain control information used to keep track of metadata such as the current unconditional volume durable LSN (VDL), in some embodiments. Null log records (NLRB) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page, in some embodiments. In some embodiments, log record types may be identified by GUIDs (rather than by integers or enums), which may simplify versioning and development, especially for ULRs.

In some embodiments, a payload of a log record may be the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size, in some embodiments. In addition, most log records may include additional parameters or data specific to that log record type, and this additional information may be considered the payload of that log record, in some embodiments. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages, in some embodiments.

Note that when storing log records in the log of a segment, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage, in some embodiments; otherwise the storage may be referred to as being out-of-band, in some embodiments. In some embodiments, the payloads of most large ULRs may be stored out-of-band.

In some embodiments, user pages may be the byte ranges (of a fixed size) and alignments thereof for a particular volume that are visible to users/clients of the storage system. User pages may be a logical concept, and the bytes in particular user pages may or not be stored in any storage page as-is, in some embodiments. The size of the user pages for a particular volume may be independent of the storage page size for that volume, in some embodiments. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware, in some embodiments.

In some embodiments, a storage node may be a single virtual machine that on which storage node server code is deployed. Each storage node may contain multiple locally attached storage devices, and may provide a network API for access to one or more segments, in some embodiments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

In various embodiments, storage devices may be a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. A storage device is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each storage device may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments, in some embodiments.

Figure 4:
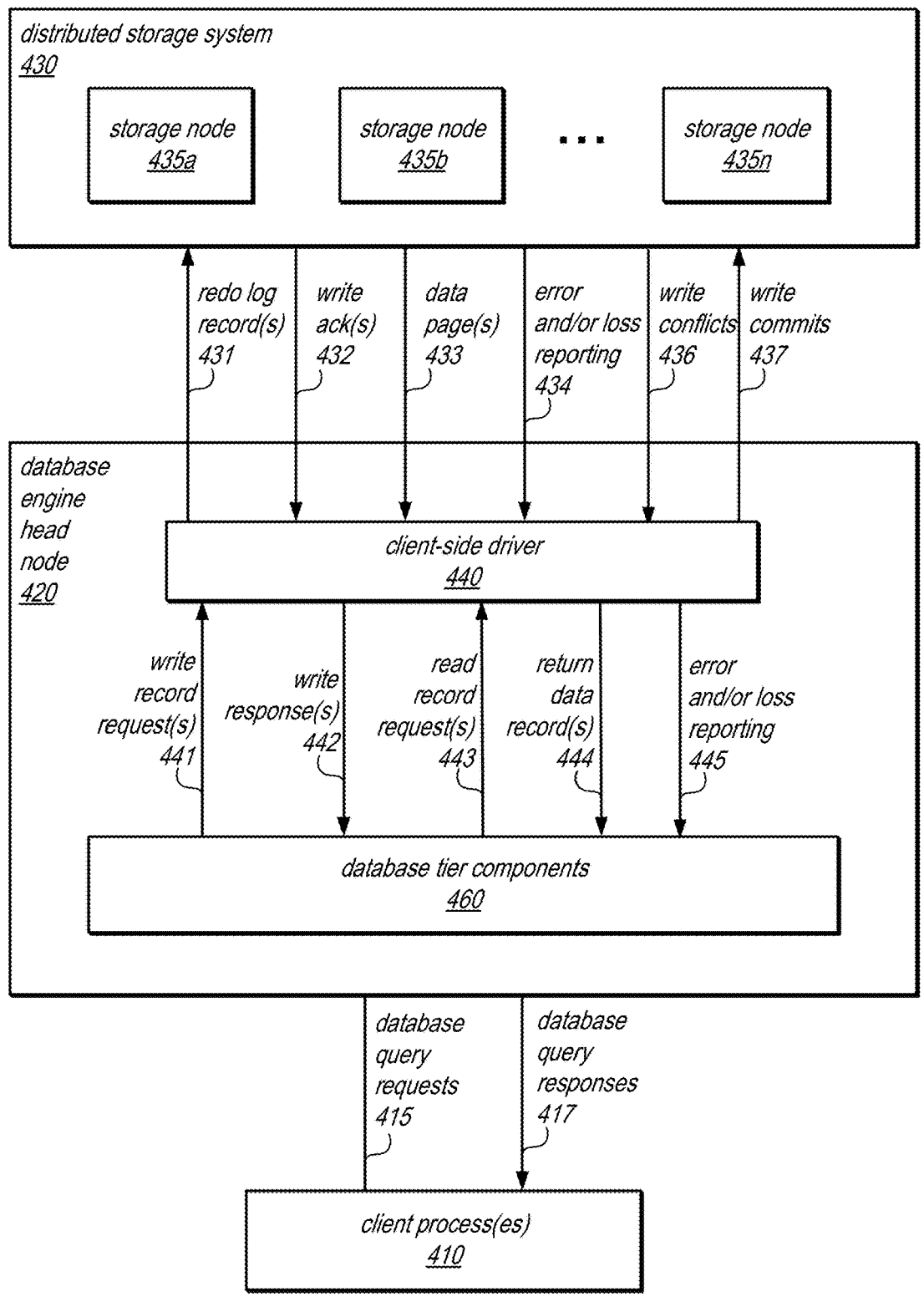
FIG. 4 is a block diagram illustrating various interactions between database writer nodes within a multi-writer database that implements optimistic atomic multi-page write operations, according to some embodiments.

FIG. 4 is a block diagram illustrating various interactions between database writer nodes within an optimistic multi-writer database that implements optimistic concurrency, according to some embodiments. In some embodiments, the database engine head node 420 may be the database write node 120 of FIG. 1, and the distributed storage system 430 may be the storage service 160 of FIG. 1.

As shown, one or more client processes 410 may store data to one or more databases maintained by a database system that includes a database engine head node 420 and a distributed storage system 430. As shown, database engine head node 420 includes database tier components 460 and client-side driver 440 (which serves as the interface between distributed storage system 430 and database tier components 460). In some embodiments, database tier components 460 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 410 may send database query requests 415 (which may include read and/or write requests targeting data stored on one or more of the storage nodes 435a-435n) to database tier components 460, and may receive database query responses 417 from database tier components 460 (e.g., responses that include write acknowledgements and/or requested data). Each database query request 415 that includes a request to write to a page may be parsed and optimized to generate one or more write record requests 441, which may be sent to client-side driver 440 for subsequent routing to distributed storage system 430. In this example, client-side driver 440 may generate one or more redo log records 431 corresponding to each write record request 441, and may send them to specific ones of the storage nodes 435 of distributed storage system 430. Distributed storage system 430 may return a corresponding write acknowledgement 423 for each redo log record 431 to database engine head node 420 (specifically to client-side driver 440). In some embodiments, storage nodes 435 may return write conflicts 436 (although in other embodiments write conflicts 436 may be included or not as part of write acknowledgements 432). For example, write conflicts may indicate writes that were successfully received and logged, but not committed as they conflict with other writes. Write commits 437 may be sent to indicate which conflicting writes can be committed, in some embodiments. In some embodiments, not illustrated, requests to cancel or otherwise exclude writes may be sent or requests to store one or more different log records that reconcile writes instead of previously stored log records (that individual reflect the reconciled writes) may be sent. Client-side driver 440 may pass these write acknowledgements to database tier components 460 (as write responses 442), which may then send corresponding responses (e.g., write acknowledgements) to one or more client processes 410 as one of database query responses 417.

In this example, each database query request 415 that includes a request to read a data page may be parsed and optimized to generate one or more read record requests 443, which may be sent to client-side driver 440 for subsequent routing to distributed storage system 430. In this example, client-side driver 440 may send these requests to specific ones of the storage nodes 435 of distributed storage system 430, and distributed storage system 430 may return the requested data pages 433 to database engine head node 420 (specifically to client-side driver 440). Client-side driver 440 may send the returned data pages to the database tier components 460 as return data records 444, and database tier components 460 may then send the data pages to one or more client processes 410 as database query responses 417.

In some embodiments, various error and/or data loss messages 434 may be sent from distributed storage system 430 to database engine head node 420 (specifically to client-side driver 440). These messages may be passed from client-side driver 440 to database tier components 460 as error and/or loss reporting messages 445, and then to one or more client processes 410 along with (or instead of) a database query response 417.

In some embodiments, the APIs 431-437 of distributed storage system 430 and the APIs 441-445 of client-side driver 440 may expose the functionality of the distributed storage system 430 to database engine head node 420 as if database engine head node 420 were a client of distributed storage system 430. For example, database engine head node 420 (through client-side driver 440) may write redo log records or request data pages through these APIs to perform (or facilitate the performance of) various operations of the database system implemented by the combination of database engine head node 420 and distributed storage system 430 (e.g., storage, access, change logging, recovery, and/or space management operations). As illustrated in the figure, distributed storage system 430 may store data blocks on storage nodes 435a-435n, each of which may have multiple attached storage devices. In some embodiments, distributed storage system 430 may provide high durability for stored data block through the application of various types of redundancy schemes.

Note that in various embodiments, the API calls and responses between database engine head node 420 and distributed storage system 430 (e.g., APIs 431-434) and/or the API calls and responses between client-side driver 440 and database tier components 460 (e.g., APIs 441-445) may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 420 and/or distributed storage system 430.

As noted above, in some embodiments, the functional components of a database system may be partitioned between those that are performed by the database engine and those that are performed in a separate, distributed, storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality.

In various embodiments, multiple writers implemented at different respective database engine head nodes may be allowed to access a same database while maintaining a single, global read view of the database. Optimistic concurrency may be implemented for writes performed by the different writers using shared storage and asynchronous I/O, in various embodiments. In some embodiments, database engine head nodes (or other write nodes) may be seamlessly added or removed for a database without disruption of database clients.

In some embodiments, database write nodes may use an asynchronous write model to achieve higher write performance with reasonable cost to read performance. Moreover, applying optimistic concurrency techniques may allow the write node, for instance, when writing a log record to continue performing other requests without waiting for the write of the log record to the log to be finalized or to be resolved on a conflict, in some embodiments.

In at least some embodiments, the isolation level supported by multiple writers may include a read-uncommitted isolation level. In some embodiments, the isolation level supported by multiple writers may include a repeatable read isolation level and/or a read-committed isolation level. In such scenarios, isolation may perform the same as if the database only had a single writer when the transactions affecting the rows are on the same instance, in some embodiments. Transactions issued to different instances may have snapshot isolation applied so that the first committed rule is applied and transactions that run into conflicts are aborted, in some embodiments. Different outcomes for such isolation levels may result depending on transaction origin (e.g., a transaction issued on the same write node may succeed where the same transaction issued on another write node would fail), in some embodiments. In some embodiments, a serializable isolation level may not be supported with multiple writers.

Figure 5:
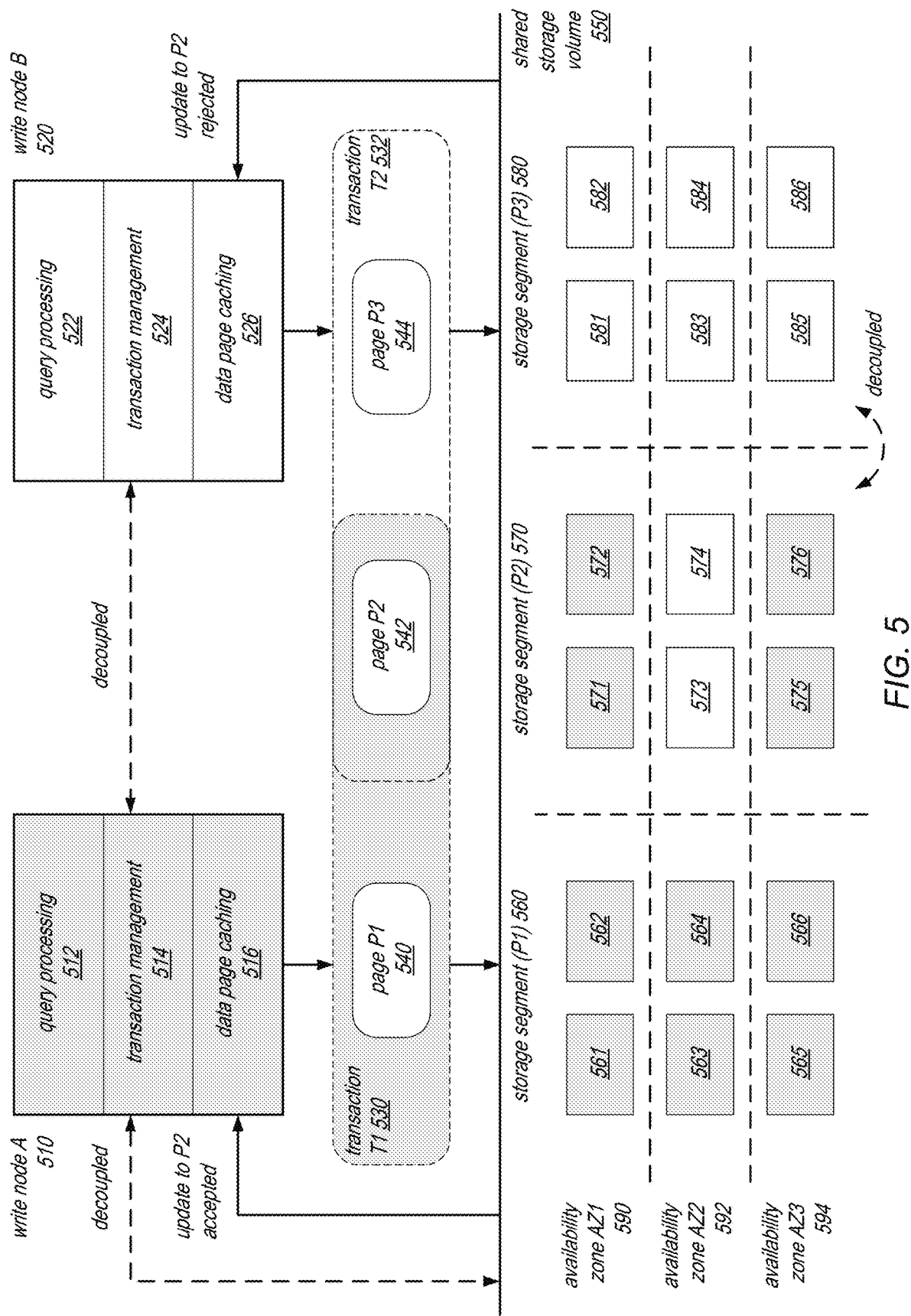
FIG. 5 is a block diagram illustrate a shared storage volume that accepts and rejects page writes based on page conflicts in a multi-writer database that implements optimistic atomic multi-page write operations, according to some embodiments.

FIG. 5 is a block diagram illustrate a shared storage volume that accepts and rejects page writes based on page conflicts in a multi-writer database that implements optimistic atomic multi-page write operations, according to some embodiments. In this example, the write nodes A 510 and B 520 may be the write nodes 120, 122, or 124, as discussed in connection with FIG. 1, and the shared storage volume 550 may be implemented by the storage service 160 of FIG. 1.

As shown, each database write node 510 and 520 in this example includes a number of functional layers or components, which are used to implement a database engine. In some embodiments, the query processing components 512 and 522 may be the query parsing, optimization and execution component 305 of FIG. 3, the transaction management components 514 and 524 may be the transaction and consistency management component 330 of FIG. 3, and data page caching component 516 may be implemented using the data page cache 335 of FIG. 3.

In some embodiments, as shown, the database system may be implemented in a decoupled architecture, where different components (e.g. the database nodes and portions of the shared storage volume 550) are implemented as independent components that can function largely independently with minimal cross-component knowledge or coordination. In some embodiments, separate components are implements on separate execution platforms (e.g. hardware servers or virtual machine instances). In some embodiments, each component may manage only a divisible portion of the functionality or data of the database system. The failure of any one independent component will not cause a global failure of the database system, and each independent component may implement their own scheme for auto-scaling and redundancy.

As shown, in this example, the write nodes A and B are decoupled. Thus, the write nodes may execute independently on different execution systems, and the two nodes may not rely on one another for core database engine functionality (e.g. to incoming SQL requests). As discussed, in some embodiments, the two write nodes may both write the shared storage volume 550 in an optimistic fashion, without coordinating with each other to resolve conflicts ahead of time. In some embodiments, the data page cache of the two nodes may reflect different states of the database.

As shown, the database write nodes 510 and 520 are also decoupled from the storage layer (e.g. the shared storage volume 550). In this respect, the storage layer and the database write nodes divide the functionality of database system. In some embodiments, the storage layer will handle all durability aspects of the database system, while the database write nodes will handle other aspects of the database system on top of the storage layer. In some embodiments, the database write nodes 510 and 520 may interact with the shared storage volume 550 via defined service interface. For example, the write nodes may submit page write operations to the storage layer, which will in turn queue and apply the page write operations to the state of the database. This type of separation represents a departure from traditional database systems, where the upper functional layers of the database system tightly coupled to the storage layer, in an integrated functional stack, which is sometimes implemented on the single server.

In some embodiments, the shared storage volume 550 or the storage layer may also implement a conflict resolution functionality, in addition to its durability functions. As discussed, in multi-writer database systems with optimistic database write nodes, the page writes submitted by the write nodes may occasional represent conflicts. For example, two writes from two different nodes may concurrently attempt to modify the same page, which may represent a conflict condition. Thus, in some embodiments, the storage layer may implement a conflict resolution protocol to both detect and resolve conflicting writes.

As shown, in this example, the storage layer is actually implemented by a number of storage nodes (nodes 561-566, 571-576, 581-586), which may be separate instances of virtual machines or virtualized instance of storage devices. As shown in this example, the storage nodes are divided into three storage segments 560, 570, and 580, and also three different availability zones 590, 592, and 594. In some embodiments, each storage segment may be assigned a range of pages for a database. In some embodiments, each availability zone may represent a zone or environment of computing infrastructure that execute independently from other availability zones (e.g. having separate power sources). By distributing storage nodes across multiple availability zones, the database system ensure that it can remain highly available in the face of the failure of one or multiple availability zones. As shown, in some embodiments, the storage segments of the shared volume are decoupled from each other. For example, even the complete failure of all storage nodes in one storage segment will not directly cause a failure of another storage segment.

As shown, in this example, each storage segment in the volume 550 is replicated across six storage nodes. In this type of system, a quorum-based conflict resolution protocol may be implemented. As shown, nodes A and B in this example have issued two transactions T1 530 and T2 532. The two transactions are issued on top of the cached state of the database seen by the two database nodes, and the two transactions are issued concurrently, so that neither transaction is aware of the other transaction. As shown, transaction T1 includes a page update to page A 540 and page B 542, while transaction T2 includes a page update to page C 544 and also page B 542. In this case, the two transactions include a pair of conflict page writes to page B 542.

When these page writes are sent to the storage layer or shared storage volume 550, the different storage nodes of the storage layer may receive the write operations at different times, and may arrive at different conclusions about how to resolve the conflict. As shown, at storage segment 560, which stores page P1, all storage nodes have accepted the update to page P1 (as indicated by the shading of nodes 561-566). At segment 580, which stores page P3, all storage nodes have accepted the update to page P3 (as indicated by the white shading of nodes 581-586). However, at segment 570, which stores page P2, some of the storage nodes (571, 572, 575, and 576) have resolve the write conflict on page P2 in favor of the write issued by write node A (as part of transaction T1), and other storage nodes (573 and 574) have instead resolved the conflict in favor of the write issued by write node B (as part of transaction T2). These nodes are shaded according to how the have resolved the conflict. In this example, the storage layer may implement a quorum-based conflict resolution protocol, where the storage layer will accept the write (and reject the other conflicting write) when a sufficient number (a "quorum") of storage nodes have accepted the winning write. In this example, the quorum needed to accept a write may be four of the six storage nodes for a particular storage segment (i.e. a majority). Because the write issued by write node A has been accepted by four storage nodes in segment 570, this write is deemed to be the winning write. Accordingly, storage nodes 573 and 574 will be overruled and will persist the winning write from node A.

As shown, in some embodiments, when a conflict is resolved, the storage layer will report back to the database write nodes (nodes A and B) whether their submitted writes have been accepted by the storage layer. In this example, the storage layer notifies to node A that its write of page P2 is accepted, and notifies node B that its write of page P2 is rejected. It is then up to write node B to rollback the transaction T2 532, or any other operations, as a result of the rejection of its write to page P2. In some embodiments, the rollback process may involve multiple write operations, as the conflict resolution process at the storage layer may take some time.

In some embodiments, the write nodes (e.g. node A) may not commit a write in its cache state until it receives a confirmation from the storage layer that that write has been accepted at the storage layer. In some embodiments, the storage layer may report a consistency point (e.g. consistency point 166 of FIG. 1), to the database nodes, which may represent the highest LSN of writes sent to the storage layer that have been accepted. Thus, if a write node A determines that the current database consistency point has moved beyond its pending writes (e.g. writes to pages P1 and P2), it may commit the result of those writes locally.

Figure 6:
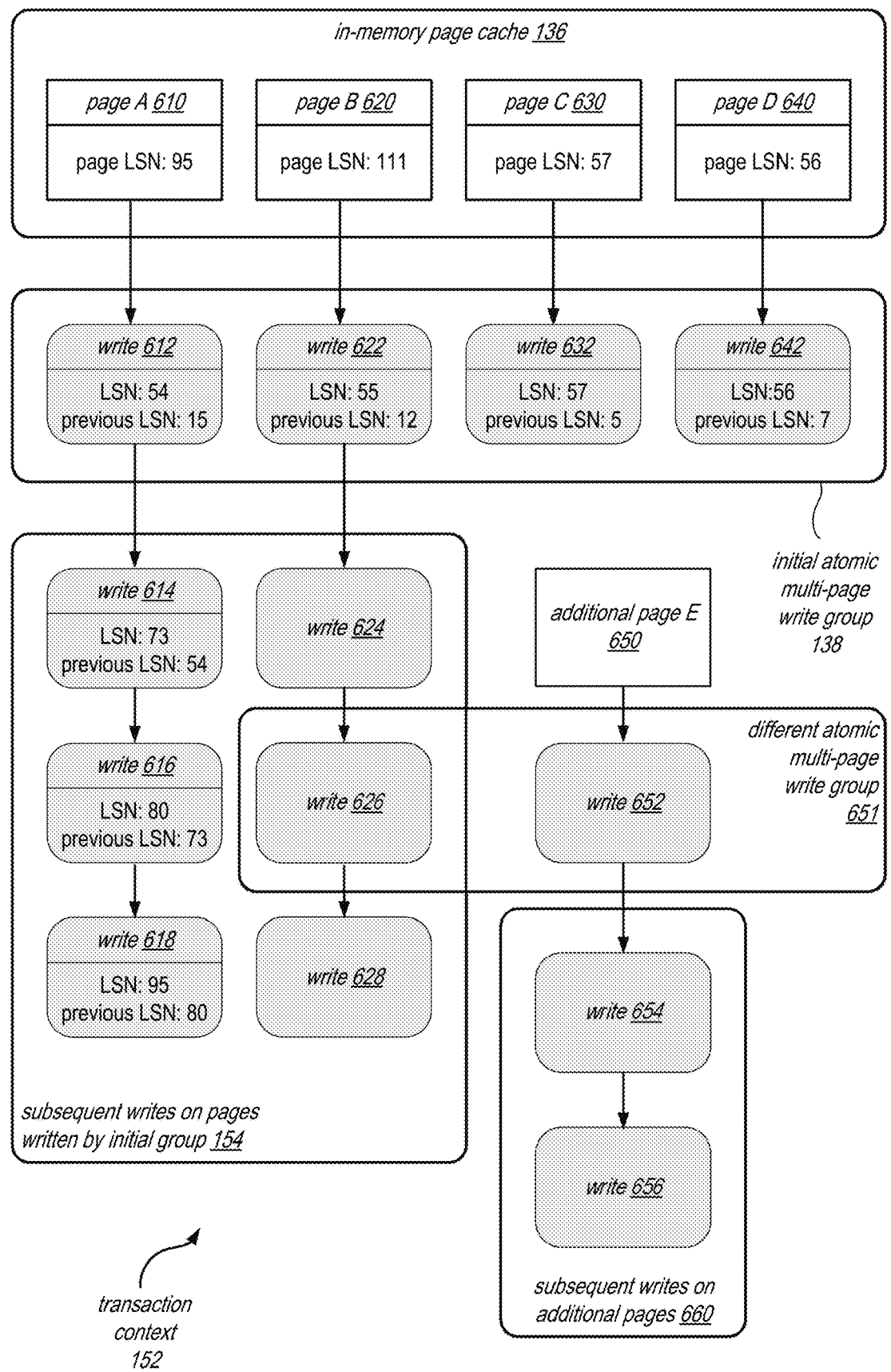
FIG. 6 illustrates an example transaction context that is maintained for a group of write operations in a multi-writer database system that implements optimistic atomic multi-page write operations, according to some embodiments.

FIG. 6 illustrates an example transaction context that is maintained for a group of write operations in a multi-writer database system that implements optimistic atomic multi-page write operations, according to some embodiments. As shown, the depicted transaction context may be the transaction context 152, as discussed in connection with FIG. 1.

As shown in this example, the in-memory page cache 136 of the database engine node stores the state of four pages, page A 610, page B 620, page C 630, and page D 640. Each page is associated with a page LSN, which is the log sequence number of the last write that updated the page, according to the database engine node. In some embodiments, the write node may store an in-sequence chain of writes that modified each page, so that the write history of the page can be ascertained at any given time. In some embodiments, writes in the chain may have a pointer to the previous write that modified the page, and also a point to a next write that modified the page. In some embodiments, the writes or LSNs may be sent to the storage layer as log entries to be logged in the database log.

As shown, all four pages are written by a group of writes in an initial atomic multi-page write operation, which may be operation 138 of FIG. 1. In this example, the writes in the atomic multi-page write operation are writes 612, 622, 632, and 642. In some embodiments, each write operation may be represented as a log entry, which has a log sequence number of LSN. As shown in this example, each log entry may also include an indication or pointer back to a previous LSN that last modified the page. In some embodiments, this history of page writes may be maintained by the database engine node outside of the transaction context data structure 152, so that the actual context 152 may only identify the set of pages 610, 620, 630, and 640 modified by the group 138 of writes, and the LSNs of the writes in the group 138.

As discussed, in some embodiments, subsequent writes 154 to the pages modified by the write group 138 may also be tracked by the transaction context 152. In some embodiments, these subsequent writes 154 may also need to be undone or cancelled in order to roll back the page state of the database engine node to a consistent state. Thus, the database engine node may monitor all writes and add any subsequent writes to pages A, B, C, and D, to the transaction context. In some embodiments, this tracking may require no action on the part of the transaction manager, since the database engine node will create the chain of write as part of the page write history automatically, even when there is no pending transaction. As shown in this example, page A has a chain of subsequent writes 614, 616, and 618, which will be rolled back as part of the transaction context 152. Similarly, page B has a write chain of subsequent writes 624, 626, and 628, which will also be rolled back as part of the transaction context 152.

As shown, in some embodiments, one of the writes included in the transaction context 152 may be part of another atomic write group. Here, write 626 belongs to the different atomic multi-page write operation 651. In that case, the canceling of that write (write 626) must cause all other writes in that other atomic write group 651 (e.g. write 652) to also be cancelled. Note that, in this example, the write 652 may be updating a page (page E 650) that is not modified by the original atomic multi-page write operation 138. However, because the later atomic multi-page write operation 651 was performed on top of that original operation 138, it will also have to be rolled back in the event of a conflict.

In some embodiments, the write operation 626 may contain an indication or pointer indicating that it is part of another atomic multi-page write group 651. In some embodiments, the write 626 may not indicate any additional metadata, and the rollback process (e.g. implemented by the transaction manager 150) may check individual writes against all pending transactions to determine if they are part of another atomic multi-page write. If so, the transaction context for that other atomic multi-page write group may be collected, and all writes in the other atomic multi-page write group will be added to the rollback process.

As shown, in this example, additional subsequent writes 660, including writes 654 and 656, have been performed on top of write 652, which will be rolled back as part of the transaction context 152, as discussed. Because writes 654 and 656 assumes that write 652 has been performed on the page state of the database engine node, the canceling of write 652 must also cancel writes 654 and 656. Thus, in some embodiments, the transaction manager may also include these subsequent writes 660 as part of the rollback. In some embodiments, this process will repeat recursively to include in the rollback all write operations that are dependent on the original write group 138.

The pseudo-code below illustrates one example implementation for the rollback process:

1. For each write on each page in an atomic multi-page write operation:
   a. Notify a storage node in the storage layer that the write for this page (e.g., represented as an LSN) has failed. (Note that this write may not have not originally been rejected by the storage layer as a conflicted write, but due to atomicity of the multi-page write operation, all writes must succeed or fail together).
   b. Walk the forward dependency chain for the LSN (that is, all LSNs performed on this page subsequent to the LSN of the write).
      i. For each LSN in the chain, notify the storage layer that that subsequent LSN should fail.
      ii. If the subsequent LSN is part of another atomic multi-page write operation, collect its context.
2. Latch of lock pages according to the database system's multi-page latching or locking protocol and rollback each page to a state prior to the atomic multi-page operation being rolled back.
3. For any contexts collected in step 1.b.ii, go to step 1 to roll back that multi-page write operation.

Note that in the above example, the rollback of each atomic multi-page write operation may be performed atomically using the database system's multi-page latching or locking protocol. In some embodiments, this protocol may be implemented by both the database engine node and the storage layer, so that the cancellation of all writes occurs in a single logical point in time. In some embodiments, the storage service may implement a programmatic interface that guarantees this atomicity. In some embodiments, the rollback of all dependent multi-page write operations may be performed together, as a single atomic operation.

Figure 7:
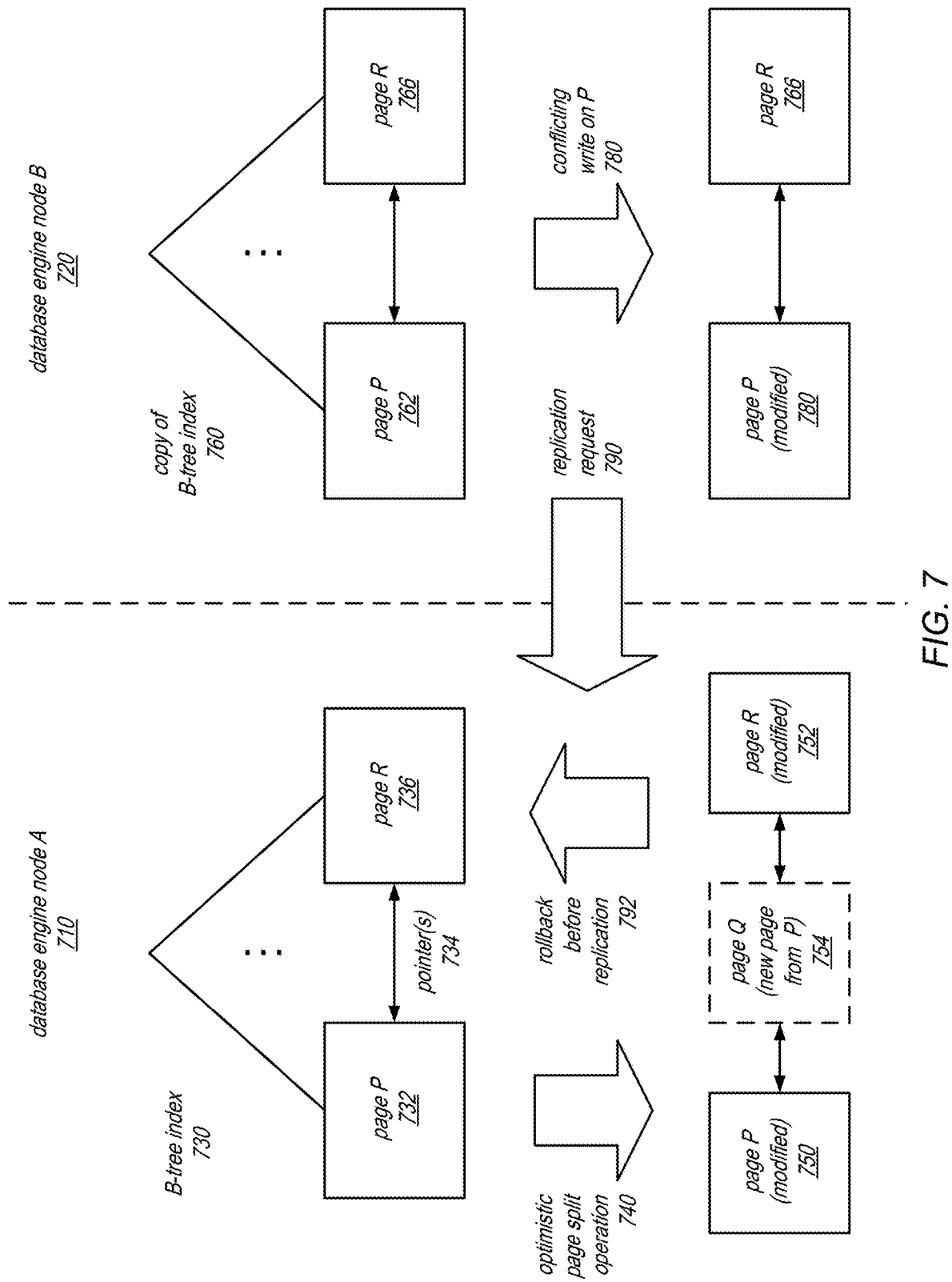
FIG. 7 illustrates a page split operation on an index object in a multi-writer database system that implements optimistic atomic multi-page write operations, according to some embodiments.

FIG. 7 illustrates a page split operation on an index object in a multi-writer database system that implements optimistic atomic multi-page write operations, according to some embodiments. In some embodiments, the database engine node A 710 and B 720 may be the database write nodes 120, 122, or 124 of FIG. 1.

The figure depicts a B-tree (balanced tree) of a database. As shown, each of nodes 710 and 720 maintains a copy of the B-tree (e.g. copies 730 and 760). In some embodiments, the B-tree may be used to implement a database object such as a database index. The leaf nodes of the B-tree may be pages of the database (e.g. pages 732, 736, 762, and 766) assigned to that index object. In some embodiments, the tree structure may also include pointers (e.g. points 734) that link sibling pages or intermediate tree nodes at individual tree levels. These pointers may be bi-directional (e.g., pointing in both the forward and backward directions), so that a quick traversal across sibling nodes or pages across the same tree level may be performed.

In some embodiments, the B-tree data structure may keep itself balanced (e.g., to avoid long tree paths) by adjusting its structure in response to addition or removal of items from the tree. In some embodiments, the balancing or adjustment may involve a page split operation, such as the optimistic page split operation 740. In this example, the page split operation 740 is splitting page P into pages P 750 and Q 754 as shown. The page split operation may involve atomically modifying three pages: page P (to move half of its records to Q), page Q (to absorb P's records), and page R (to change its "left" sibling point to Q). Between performing the operation in memory on database engine node A (dropping the page locks or latches) and waiting for the status of the updates to resolve at the storage layer, an update from database engine node B that overlaps with this atomic page split operation may cause the page split operation to be rolled back 792. As may be appreciated by those skilled in the art, other types of operations on an index such as index 730 may also involve atomic multi-page operations. For example, a merge operation (e.g. one that combines two pages in the index to shrink the index) may also involve updates to multiple pages. Like a split operation, the merge operation may also be implemented as an atomic multi-page operation in the manner discussed, so that the entire operation may be rolled back if needed.

In some embodiments, the conflict may be reported to node A by the storage layer, via a rejection of one of the page writes. In some embodiments, the conflict may be provided to node A via a replication request 790, as shown. In some embodiments, the database engine nodes 720 may propagate changes to the database among each other, via these replication requests. The replication request 790 may overwrite some of the cached pages at node A. If the overwritten pages include one of the pages that should be rolled back (e.g. a page identified in the transaction context associated with operation 740), this may cause the page state of node A to be corrupted. For instance, suppose an update for page P (creating modified page P 780) is received by node A from node B. At this point in time, this update may have been accepted at the storage layer. However, node B did not know about node A's B-tree split, which is still in limbo, when it performed the update on its version of page P. Replacing page P on node A with node B's version of page P will erase the side pointer change to the new page Q, causing B-tree corruption.

Accordingly, in some embodiments, incoming replication changes from another database engine node will be checked against pending transactions in the receiving database engine node. If any conflicting transactions are detected, all of the detected transactions must be fully rolled back, before applying the replication changes. Similarly, a page load from the storage layer by node A will also cause a rollback of any conflicting transactions at node A. The loaded page will only be applied to the memory state of node A after any conflicting transactions are rolled back.

In some embodiments, a conflict in the database state may be learned by node A via other means (other than replication request 790), such as for example when node A reads a page from the storage layer that node A as attempt to write. In some embodiments, the read may occur before the storage layer reports a conflict for that attempted write. Node A may determine from the read that page in the database's master state is inconsistent with its own view of the page in the local cache. Accordingly, in that case, node A may roll back its write to the page, along with other operations indicated in the transaction context, before applying the results of the read to its cached state. Node A may then attempt to perform the write that was rolled back on top of the new database state.

In some embodiments, to detect potential conflicts, node A may maintain a data structure in memory (e.g. a page map) that identifies all pages that are part of any pending atomic multi-page write operations that are awaiting multi-write resolutions. Using this map, node A can quickly detect a conflict between any incoming page updates (e.g. replication requests or page loads) and its pending optimistic transactions. This detection will then trigger a failure and rollback of the optimistic transaction before applying the incoming page update.

Figure 8:
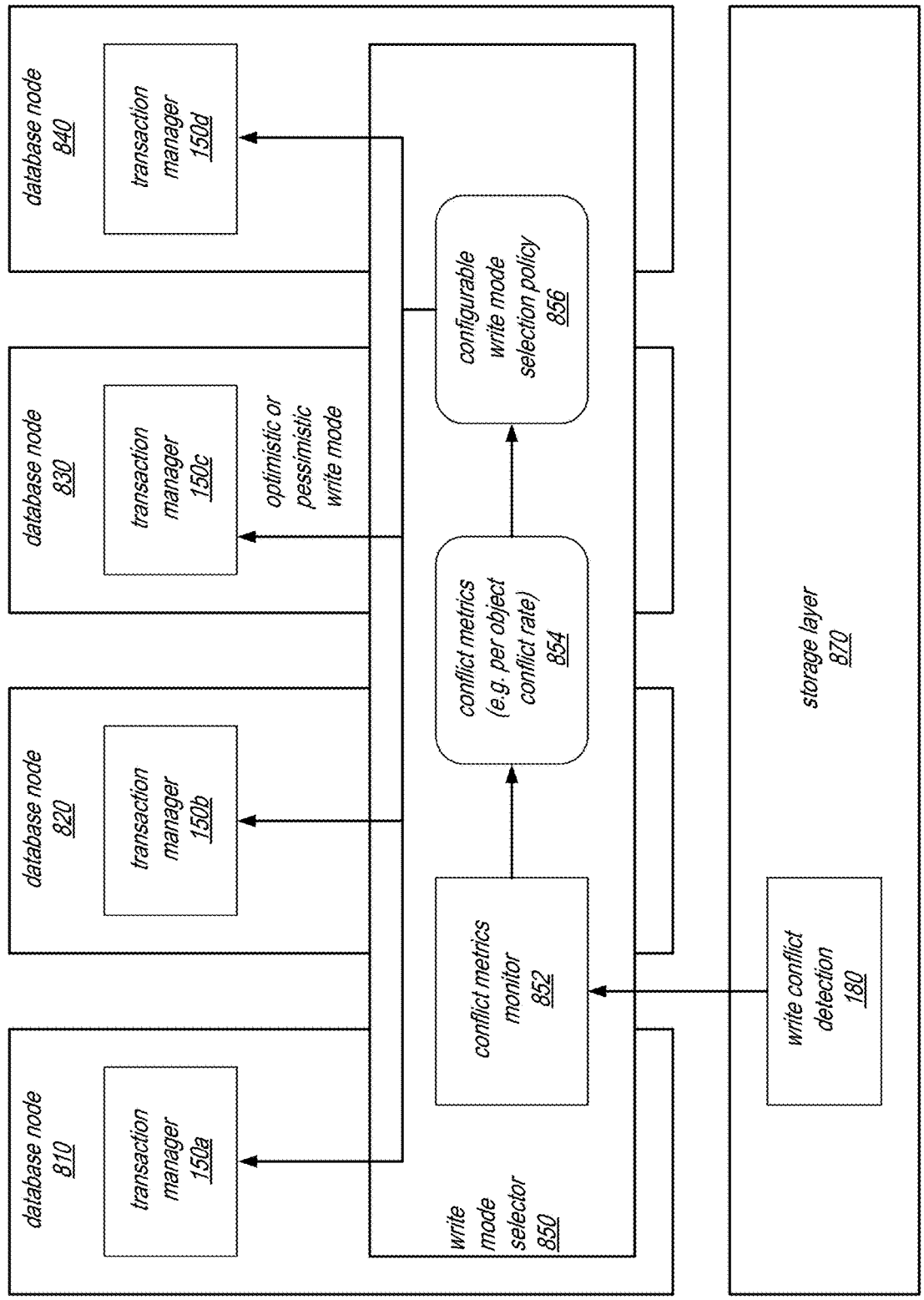
FIG. 8 illustrates a write mode selector that selects between an optimistic or a pessimistic write mode in a multi-writer database system that implements optimistic atomic multi-page write operations, according to some embodiments.

FIG. 8 illustrates a write mode selector that selects between an optimistic or a pessimistic write mode in a multi-writer database system that implements optimistic atomic multi-page write operations, according to some embodiments. In this example, databases nodes 810, 820, 830, and 840 may be the database write node 120 of FIG. 1, and as shown, each database node implements a transaction manager 150, as discussed in connection with FIG. 1. In this example, the storage layer 870 may be implemented using the storage service 160 of FIG. 1, and as shown, the write conflict detection module 180 of FIG. 1 is implemented by the storage layer 870.

As shown, in some embodiments, the database nodes 810, 820, 830, and 840 jointly implement a write mode selector 850. In some embodiments, the write mode selector 850 may be configured to automatically select a write mode (e.g., an optimistic write mode or a pessimistic write mode) for the database nodes, based on certain conflict metrics. In some embodiments, in an optimistic write mode, the database node(s) may not check for write conflicts before applying writes in an atomic multi-page write operation to its own local memory state and sending the atomic multi-page write operation to the storage layer. Thus, the database node(s) may implement a rollback process discussed above to retroactively rollback the atomic multi-page write operation, in the event of a later-detected conflict. In some embodiments, in a pessimistic write mode, the database node(s) may wait to apply writes in an atomic multi-page write operation to its own local memory state, until the node can confirm that all writes in the atomic operation are conflict-free in the database system (e.g., as reported by the storage layer 870).

As may be understood, in some situations, an optimistic write mode may provide better performance, for example, in cases where write conflicts are rare. However, in a situation where write conflicts are more frequent (e.g. where many atomic multi-page write operations are resulting in conflicts), an optimistic approach may actually be less performant, because large numbers of multi-page write operations must be rolled back and reattempted. The write mode selector 850 thus allows the database nodes to monitor the degree of conflict in the database system, and automatically tune the write mode by themselves.

In some embodiments, the write mode selector 850 may be implemented for individual ones of the database nodes 810, 820, 830, and 840, as opposed to collectively for all nodes. Thus, in some embodiments, the write mode may be selected for the nodes individually, for example, to allow each node to decide for itself whether to perform writes optimistically or pessimistically. In some embodiments, the write mode selection policy 856 of individual modes may be different, so that their selection behavior will differ. For example, in some embodiments, a high-priority node may always perform atomic multi-page write operations optimistically, while a lower-priority node may only be allowed to perform writes optimistically when it is sufficiently safe to do so.

As shown, the write mode selector 850 may include a conflict metrics monitor 852, which may monitor and update certain types of conflict metrics 854 detected in the database system. In some embodiments, the database nodes may share this information among one another using a shared protocol, for example, to determine a global value for a conflict metric 854. In some embodiments, the conflict metrics may indicate an amount of conflicts detected within the database system. In some embodiments, the amount of conflicts may be counted based on time periods to determine a conflict rate. For example, the conflict metric may indicate an average number of page conflicts per hour, determined in a rolling window of time (e.g. in the last week). In some embodiments, the conflict metric 854 may be aggregated in various ways, for example, by database object, by database tablespace, by database node, etc. In this manner, the write mode may be selected individually for each database object, database tablespace, or database node, etc.

As shown, the conflict metrics 854 may then be fed to a configurable write mode selection policy 856, in order to determine the current write mode (e.g. optimistic or pessimistic mode) for the database system. In some embodiments, the policy 856 may be configurable via a configuration interface, such as a graphical user interface, a programmatic interface, or as a configuration file. In some embodiments, the selection policy 856 may indicate a threshold for a conflict metric 854, so that if the observed value for the conflict metrics is above or below a threshold, a write mode change may be triggered. In some embodiments, the selection policy may depend on multiple types of conflict metrics, and also historical or predicted values of the conflict metrics. For example, in some embodiments, the selection policy may indicate that a write mode will be changed to pessimistic if the conflict metric remains above the threshold for three consecutive time periods. In some embodiments, the write mode selection policy may also depend on other configurable parameters, such as the type of database object, the time of day, week, etc., or user configuration parameters.

Figure 9:
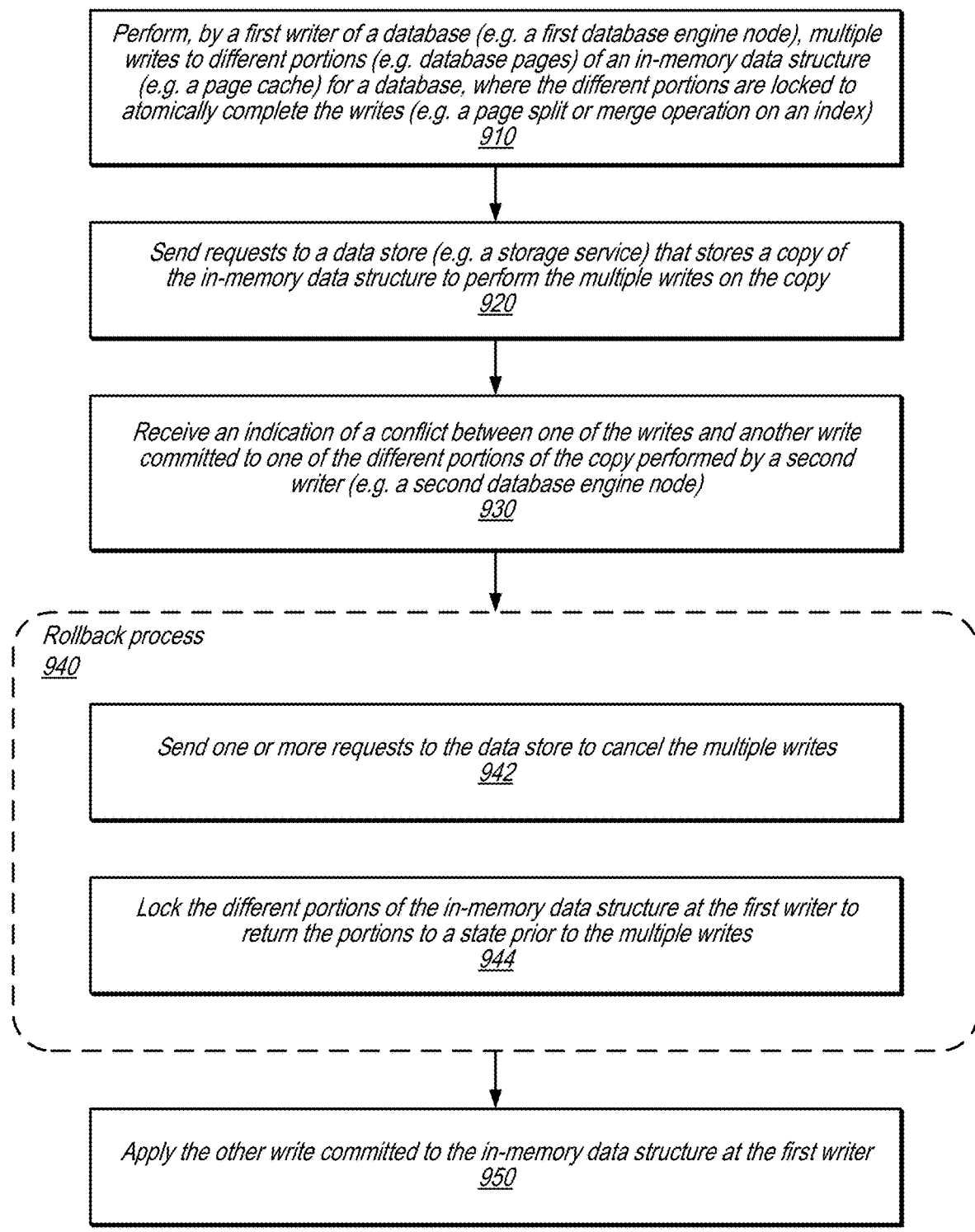
FIG. 9 is a flowchart illustrating a process of initiating a group of optimistic atomic multi-page write operations and then rolling back the group as a result of a detected conflict, according to some embodiments.

FIG. 9 is a flowchart illustrating a process of initiating a group of optimistic atomic multi-page write operations and then rolling back the group as a result of a detected conflict, according to some embodiments. In some embodiments, the depicted process may be performed by a database write node of a multi-writer database that perform writes optimistically, such as database write node 120 of FIG. 1.

The process begins at operation 910, where a first writer of a database (e.g. database write node 120 of FIG. 1) performs multiple writes to different portions of an in-memory data structure for a database, where the different portions are locked to atomically complete the writes. As indicated, the different portions may be different database pages, and the in-memory data structure may be a page cache of the database write node. The multiple writes may all be part of an atomic multi-page write operation, such as an atomic page split or merge operation on an index. In some embodiments, to write the in-memory data structure with the multiple writes, the in-memory data structure may lock the multiple pages or portions targeted by the writes, so that the multi-page write operation can occur atomically. In some embodiments, the locks or latches for the multiple pages may be release immediately after the multi-page write is performed in memory, without waiting for these writes to be checked for conflicts with writes from other optimistic database write nodes.

At operation 920, one or more requests are sent to a data store (e.g., the storage service 160 of FIG. 1), which may store a copy of the in-memory data structure. In some embodiments, the storage service may store all pages of the database, and is shared among the different database write nodes. The one or more requests are sent to the storage service to perform the atomic multi-page write operation. In some embodiments, the writes may be sent as log entries to be logged in a database log maintained by the storage service, which may be applied in sequence to the actual database pages. In some embodiments, the requests may be sent to the storage service without acquiring a global lock on the database pages in the storage service. However, in some embodiments, the database write node may maintain a transaction for the multiple page writes, as discussed, so that the multiple page writes can be rolled back, if needed.

At operation 930, the database write node receives an indication of a conflict between one of the writes and another write committed to one of the different portions of the copy performed by a second writer (e.g. a second database engine node). In some embodiments, as discussed, the storage service may be configured to report page write conflict among the different writes submitted by the nodes. In some embodiments, the storage service may resolve the conflict by selecting a winning write operation between two conflicting writes. In some embodiments, the conflict is simply reported to the database nodes, and it is up to the nodes to resolve the conflict. In some embodiments, the two nodes that are parties to two conflict writes may consult another database write node to resolve the conflict. In some embodiments, the conflict may be detected at the first database write node via other mechanisms, for example, via a replication from another database node, or via an explicit loading of a page from the storage service.

As shown, operations 942 and 944 are part of a rollback process 940. In this example, the write operation that conflicts with the committed write of the second writer is the losing operation (here because the other write is already committed or accepted by the storage service). In this case, the entire group of multiple writes in the atomic multi-page write operation must be rolled back, because the group of writes must be performed as an atomic unit.

At operation 942, one or more requests are sent to the data store to cancel the multiple writes. In some embodiments, these requests may be submitted via a programmatic interface of the storage service, which may cause the uncommitted writes to be removed from the write queue. In some embodiments, the storage service may be configured to cancel the multiple writes in an atomic fashion.

At operation 944, the different portions or pages of the in-memory data structure are locked at the first writer, in order to return the portions or pages modified by the multiple writes to a state prior to the multiple writes. Thus, the first database write node may undo the atomic multi-page write operation in its own page cache, which may involve consulting a transaction context to identify all of the writes that must be undone. As discussed, in some embodiments, the rollback process may involve undoing updates to not only pages that were updated by writes in the atomic multi-page write operation, but also other pages that were modified by other atomic multi-page write operations that were performed on top of the original atomic multi-page write operation. In some embodiments, to perform the rollback, all of the affected pages in the page cache may be collective locked, so that they can be rolled back to a previous consistent state in an atomic fashion.

At operation 950, the other write committed by the second writer is applied to the in-memory data structure of the first writer. As discussed, in this example, the other write is the winning write, and it will be applied to the page cache of the first database write node to reflect the globally accepted state of the database. In some embodiments, a pending, uncommitted database transaction at the first database write node must be rolled back before the winning conflicting write is applied, so as to guarantee the page cache remains in a consistent state. In some embodiments, the first database write node may attempt to retry the atomic multi-page write operation again at a later time, on top of the page state that contain the write from the second database write node.

Figure 10:
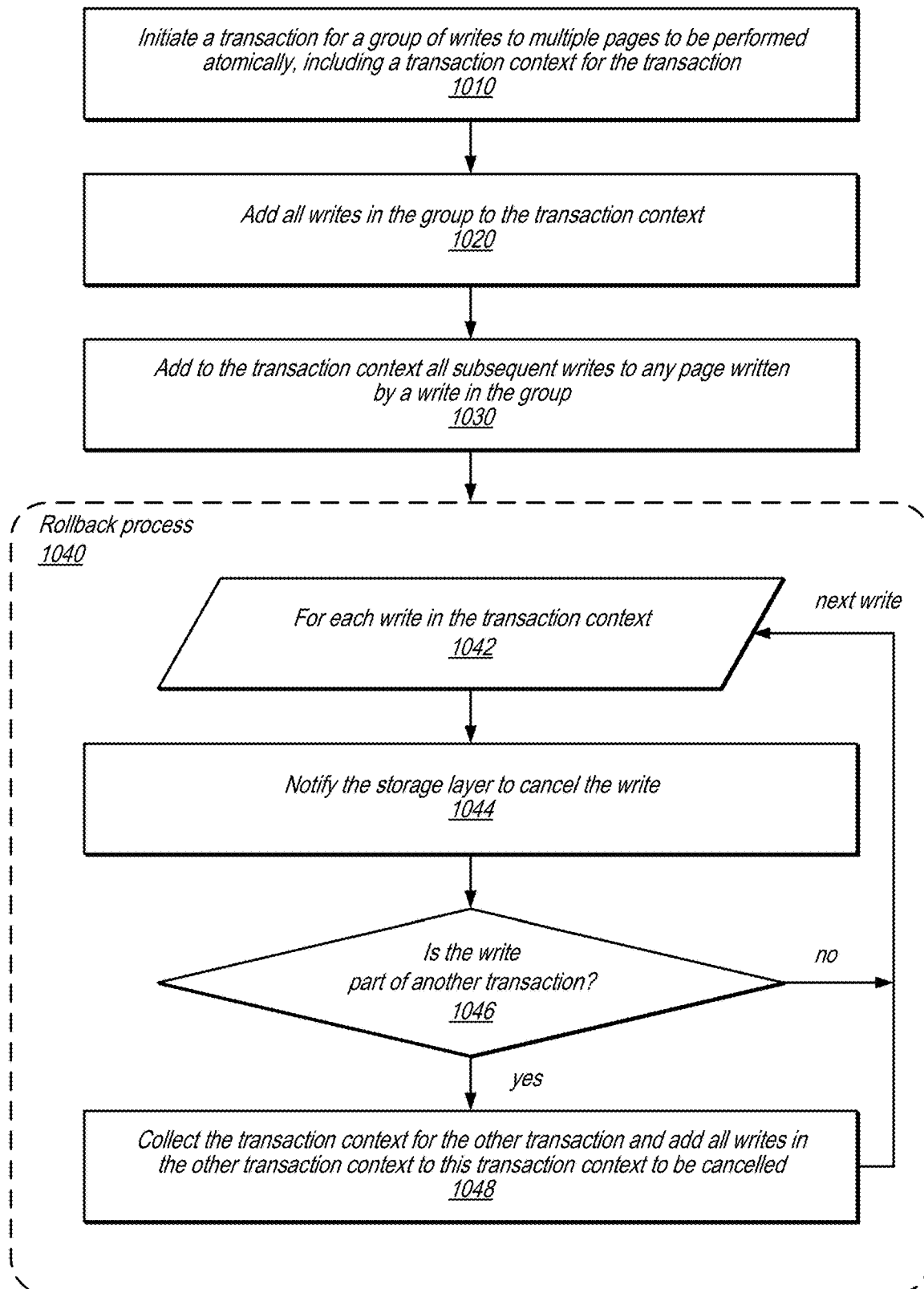
FIG. 10 is a flowchart illustrating a process of maintaining and using a transaction context in a multi-writer database system that implements optimistic atomic multi-page write operations, according to some embodiments.

FIG. 10 is a flowchart illustrating a process of maintaining and using a transaction context in a multi-writer database system that implements optimistic atomic multi-page write operations, according to some embodiments. In some embodiments, the depicted process may be performed by a database write node of a multi-writer database that perform writes optimistically, such as database write node 120 of FIG. 1.

At operation 1010, a transaction is initiated for a group of writes to multiple pages to be performed atomically, including a transaction context for the transaction. As discussed, in some embodiments, to implement atomic multi-page write operations, the database write node will implement a transaction, to track all page writes that must be cancelled in the event of a conflict. This transaction context may be, for example, the transaction context 152 of FIG. 1, which may be managed by the transaction manager 150 of FIG. 1. In some embodiments, the transaction context may be an in-memory data structure that is allocated for each individual atomic multi-page write operation.

At operation 1020, all writes in the atomic group are added to the transaction context. As discussed, in some embodiments, this grouping of writes allows these writes to be later cancelled as a group. In some embodiments, the database write node may maintain an update history for each page in its page cache, for example, as a chain of LSNs on each page. In some embodiments, the transaction context may simply be updated to refer to the LSNs of the writes that are part of the atomic multi-page write operation.

At operation 1030, all subsequent writes to any page written by a write in the atomic group are also added to the transaction context. As discussed in connection with FIG. 6, in some embodiments, an invalid write in the update chain of a page cause all subsequent writes in the chain to also be invalidated. Thus, if any further writes occur on any of the pages modified by the atomic multi-page write transaction, they must also be added to the transaction context to be potentially rolled back. In some embodiments, this step may involve no action by the transaction manager, because the database write node is already maintaining the update history chain for each page.

As shown, operations 1042, 1044, 1046, and 1046 in the figure are all performed as part of a rollback process 1040. The rollback process 1040 may be performed as part of the rollback process 960, as discussed in connection with FIG. 9, in particular, operation 942 of FIG. 9. As discussed, a rollback may be triggered if a conflict is detected for the atomic multi-page write operation from another write, which may occur in a number of ways.

As shown in operation 1042, a loop is implemented to cancel each write identified in the transaction context. The loop will repeat for each write in the transaction context (or any additional transaction contexts implicated), until no more writes remain to be cancelled.

At operation 1044, or each individual write, the storage is notified to cancel that write. This process thus ensures that all writes identified by the transaction context (and also any additional implicated transactional contexts) are all cancelled at the storage layer. Additionally, as discussed in connection with FIG. 9, all of these writes are also rolled back at the local page cache of the first database write node. In some embodiments, each write cancel request may be sent to the storage service individually. In some embodiments, all of the write cancel requests may be sent to the storage service together, for example as a single request, and the storage service may perform all of the cancellations atomically.

At operation 1046, a determination is made whether an individual write is part of another transaction maintained by the first database write node. As discussed in connection with FIG. 6, in some embodiments, the cancellation of one atomic multi-page write operation may cause other atomic multi-page write operations to also fail. When this occurs, as shown in operation 1048, the transaction context of the other transaction may be collected, and all writes from that other transaction context will be added to the current transaction context (or to the rollback process 1040) to be unrolled. In some embodiments, the determination of operation 1046 may be performed based on a page map, which contains all pages that currently have an uncommitted transaction associated with it. This page map may be checked for each individual write examined by the rollback process, to quickly determine if an additional page needs to be added to the rollback process. As shown, the process will repeat until there are no more remaining writes to be cancelled.

Figure 11:
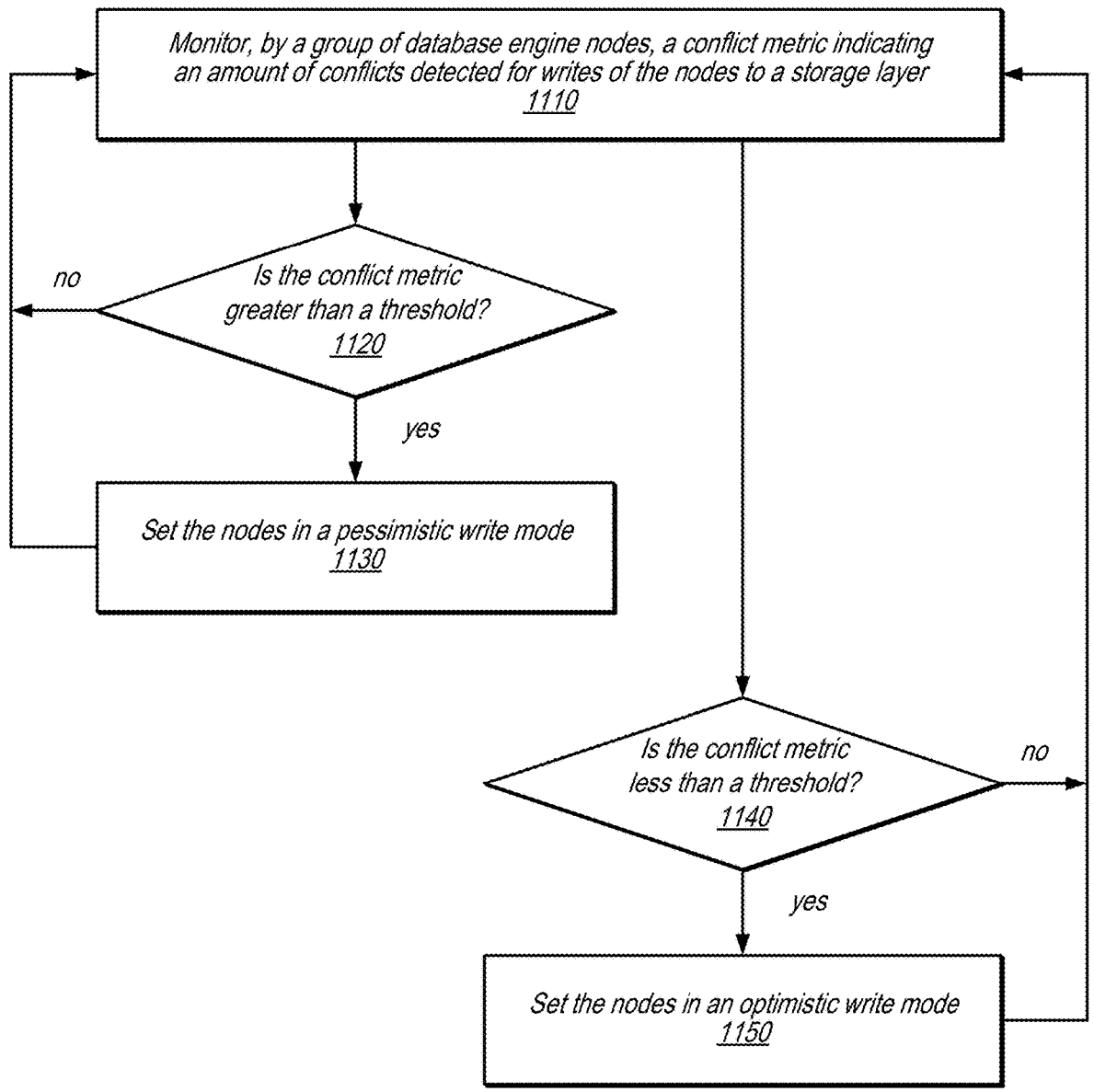
FIG. 11 is a flowchart illustrating a process of selecting between an optimistic or a pessimistic write mode in a multi-writer database system that implements optimistic atomic multi-page write operations, according to some embodiments.

FIG. 11 is a flowchart illustrating a process of selecting between an optimistic or a pessimistic write mode in a multi-writer database system that implements optimistic atomic multi-page write operations, according to some embodiments. In some embodiments, the depicted process may be performed by, for example, the write mode selector 852, as discussed in connection with FIG. 8.

At operation 1110, a group of database engine nodes monitor a conflict metric that indicates an amount of conflicts detected for writes of the nodes to a storage layer. In some embodiments, the group of database engine nodes may be nodes 810, 820, 830, and 840 of FIG. 8, the storage layer may be the storage layer 870 of FIG. 8, and the conflict metric may be one of the conflict metrics 854 of FIG. 8. In some embodiments, the storage layer may report write conflicts to the database engine nodes, and the database engine nodes may share this information to maintain up-to-date information about the conflict metric. In some embodiments, the database engine nodes may implement a communication protocol, such as a gossip protocol, to share information about the conflict metric. In some embodiments, one or more database engine nodes may be designated as a central authority to aggregate information about the conflict metric. In some embodiments, each database engine node my gather only its own conflict data and determine its own conflict metric, independently from the other database engine nodes.

At operation 1120, a determination is made, periodically, whether the conflict metric is greater than a threshold. If so, the process proceeds to operation 1130, where the nodes are put into a pessimistic write mode. In some embodiments, in a pessimistic write mode, atomic multi-page write operations may not be performed until all writes in the atomic multi-page write operation are verified to be conflict-free (e.g. based on a conflict check at the storage layer). Thus, in the pessimistic mode, there may be no retroactive rollback of atomic multi-page write operations. In some embodiments, where there are a large number of conflicts in the writes, the pessimistic mode may perform better. In some embodiments, the threshold or some other mode change trigger condition may be specified in a mode selection policy (e.g. policy 856 of FIG. 8), which may be configurable by a user. In some embodiments, the selected write mode may only apply to a particular database object, a particular database tablespace, or a particular database engine node.

At operation 1140, a determination is made, periodically, whether the conflict metric is less than a threshold. If so, the process proceeds to operation 1140, where the nodes are put into an optimistic write mode. In some embodiments, in an optimistic write mode, atomic multi-page write operations may not performed without waiting for all writes in the atomic multi-page write operation to be confirmed to be conflict-free. Thus, in the optimistic mode, an atomic multi-page write operation may need to be retroactive rolled back. In some embodiments, where there only a small number of conflicts in the writes, the optimistic mode may perform better. In some embodiments, the threshold or some other mode change trigger condition may be specified in a mode selection policy (e.g. policy 856 of FIG. 8), which may be configurable by a user. In some embodiments, the selected write mode may only apply to a particular database object, a particular database tablespace, or a particular database engine node.

Figure 12:
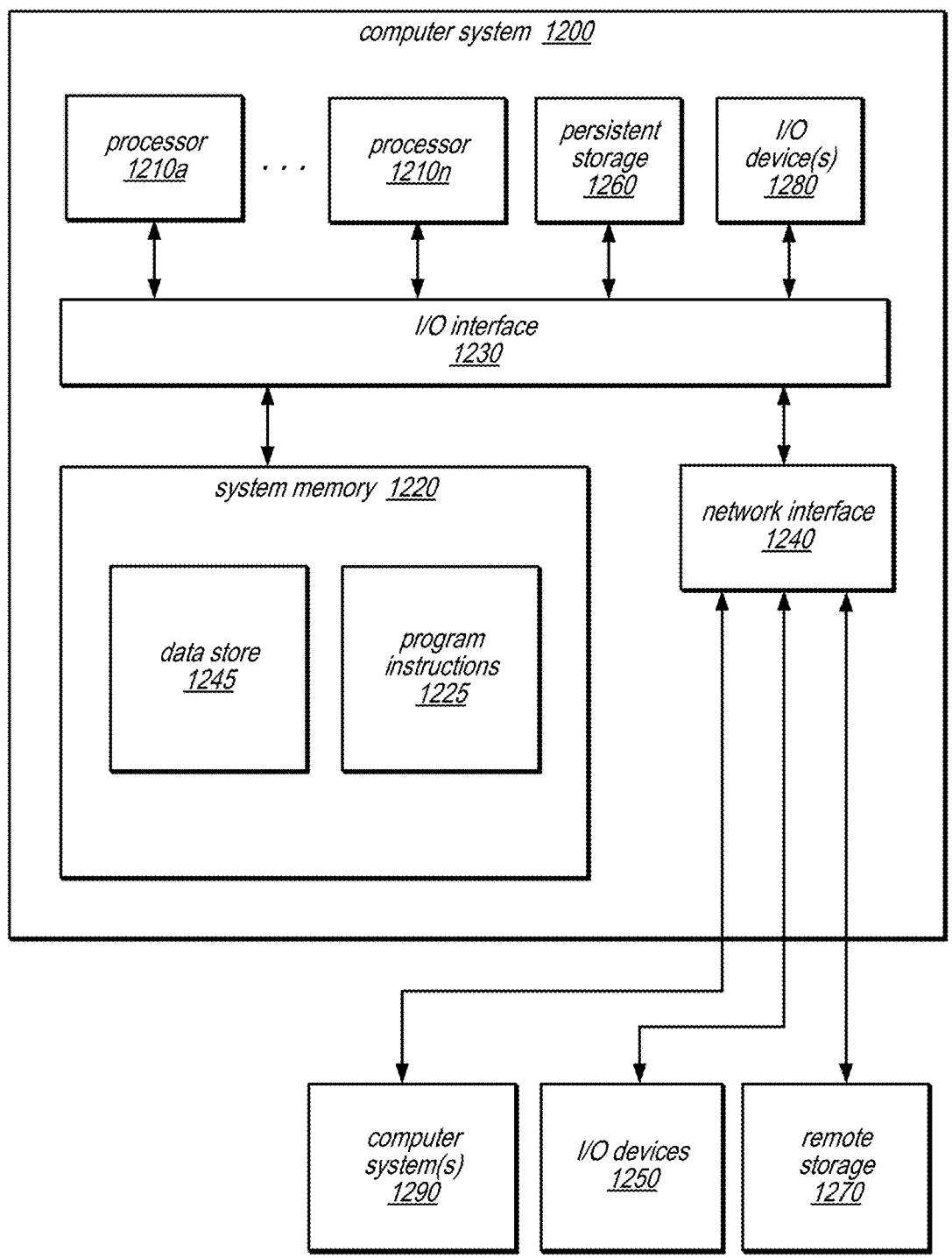
FIG. 12 is a block diagram illustrating an example computer system that can be used to implement one or more portions of a multi-writer database system that implements optimistic atomic multi-page write operations, according to some embodiments.

FIG. 12 is a block diagram illustrating an example computer system that can be used to implement one or more portions of a multi-writer database system that implements optimistic atomic multi-page write operations, according to some embodiments. Computer system 1200 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1200 includes one or more processors 1210 (any of which may include multiple cores, which may be single or multi-threaded) coupled to a system memory 1220 via an input/output (I/O) interface 1230. Computer system 1200 further includes a network interface 1240 coupled to I/O interface 1230. In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. The computer system 1200 also includes one or more network communication devices (e.g., network interface 1240) for communicating with other systems and/or components over a communications network (e.g. Internet, LAN, etc.). For example, a client application executing on system 1200 may use network interface 1240 to communicate with a server application executing on a single server or on a cluster of servers that implement one or more of the components of the database systems described herein. In another example, an instance of a server application executing on computer system 1200 may use network interface 1240 to communicate with other instances of the server application (or another server application) that may be implemented on other computer systems (e.g., computer systems 1290).

In the illustrated embodiment, computer system 1200 also includes one or more persistent storage devices 1260 and/or one or more I/O devices 1280. In various embodiments, persistent storage devices 1260 may correspond to disk drives, tape drives, solid state memory, other mass storage devices, or any other persistent storage device. Computer system 1200 (or a distributed application or operating system operating thereon) may store instructions and/or data in persistent storage devices 660, as desired, and may retrieve the stored instruction and/or data as needed. For example, in some embodiments, computer system 1200 may host a storage system server node, and persistent storage 1260 may include the SSDs attached to that server node.

Computer system 1200 includes one or more system memories 1220 that store instructions and data accessible by processor(s) 1210. In various embodiments, system memories 1220 may be implemented using any suitable memory technology, (e.g., one or more of cache, static random-access memory (SRAM), DRAM, RDRAM, EDO RAM, DDR RAM, synchronous dynamic RAM (SDRAM), Rambus RAM, EEPROM, non-volatile/Flash-type memory, or any other type of memory). System memory 1220 may contain program instructions 1225 that are executable by processor(s) 1210 to implement the methods and techniques described herein. In various embodiments, program instructions 1225 may be encoded in platform native binary, any interpreted language such as Java™ byte-code, or in any other language such as C/C++, Java™, etc., or in any combination thereof. For example, in the illustrated embodiment, program instructions 1225 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1225 may implement multiple separate clients, server nodes, and/or other components.

In some embodiments, program instructions 1225 may include instructions executable to implement an operating system (not shown), which may be any of various operating systems, such as UNIX, LINUX, Solaris™, MacOS™, Windows™, etc. Any or all of program instructions 1225 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1200 via I/O interface 1230. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1240.

In some embodiments, system memory 1220 may include data store 1245, as described herein. For example, the information described herein as being stored by the database tier (e.g., on a database engine head node), such as a transaction log, an undo log, cached page data, or other information used in performing the functions of the database tiers described herein may be stored in data store 1245 or in another portion of system memory 1220 on one or more nodes, in persistent storage 1260, and/or on one or more remote storage devices 1270, at different times and in various embodiments. Similarly, the information described herein as being stored by the storage tier (e.g., redo log records, coalesced data pages, and/or other information used in performing the functions of the distributed storage systems described herein) may be stored in data store 1245 or in another portion of system memory 1220 on one or more nodes, in persistent storage 1260, and/or on one or more remote storage devices 1270, at different times and in various embodiments. In general, system memory 1220 (e.g., data store 1245 within system memory 1220), persistent storage 1260, and/or remote storage 1270 may store data blocks, replicas of data blocks, metadata associated with data blocks and/or their state, database configuration information, and/or any other information usable in implementing the methods and techniques described herein.

In one embodiment, I/O interface 1230 may coordinate I/O traffic between processor 1210, system memory 1220 and any peripheral devices in the system, including through network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments, some or all of the functionality of I/O interface 1230, such as an interface to system memory 1220, may be incorporated directly into processor 1210.

Network interface 1240 may allow data to be exchanged between computer system 1200 and other devices attached to a network, such as other computer systems 1290 (which may implement one or more storage system server nodes, database engine head nodes, and/or clients of the database systems described herein), for example. In addition, network interface 1240 may allow communication between computer system 1200 and various I/O devices 1250 and/or remote storage 1270. Input/output devices 1250 may, in some embodiments, include one or more display terminals, keyboards, keypads, touchpads, scanning devices, voice or optical recognition devices, or any other devices suitable for entering or retrieving data by one or more computer systems 1200. Multiple input/output devices 1250 may be present in computer system 1200 or may be distributed on various nodes of a distributed system that includes computer system 1200. In some embodiments, similar input/output devices may be separate from computer system 1200 and may interact with one or more nodes of a distributed system that includes computer system 1200 through a wired or wireless connection, such as over network interface 1240. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks, such as other types of Ethernet networks, for example. Additionally, network interface 1240 may support communication via telecommunications/telephony networks such as analog voice networks or digital fiber communications networks, via storage area networks such as Fibre Channel SANs, or via any other suitable type of network and/or protocol. In various embodiments, computer system 1200 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:
1. A system, comprising:
    one or more hardware processors with associated memory that implement a storage service configured to store pages of a database; and one or more hardware processors with associated memory that implement a plurality of database engine nodes configured to send requests to write the pages stored by the storage service, including a first database engine node configured to:
  perform respective writes to different pages of the database in an in-memory data structure of the first database engine node, wherein the different pages are locked to atomically complete the writes;
  send requests to the storage service to perform the respective writes on copies of the different pages stored by the storage service;
  receive an indication of a conflict between one of the writes and a write, generated by a second database engine node of the database, committed to a copy of one of the different pages at the storage service;
  responsive to receiving the indication of the conflict:
    send one or more requests to the storage service to cancel the respective writes;
    lock the different pages in the in-memory data structure to return the different pages to a state prior to the respective writes; and
    apply the write committed by the second database engine node to the one page in the in-memory data structure.

2. The system of claim 1, wherein to perform the respective writes to the different pages, the database engine node is configured to:
  perform the respective writes as part of a page split operation or a page merge operation in an index of the database.

3. The system of claim 1, wherein the database engine node is configured to:
  maintain a transaction context for the writes to the different pages, wherein the transaction context identifies the writes to the different pages and all subsequent writes generated by the database engine node to the different pages; and
  to cancel the respective writes at the storage service, the database engine node is configured to cause the storage service to cancel the subsequent writes to the different pages identified in the transaction context.

4. The system of claim 3, wherein to cancel the respective writes at the storage service, the database engine node is configured to:
  determine that at least one of the writes identified in the transaction context belongs to another pending transaction for another group of writes; and
  cause the other group of writes to be cancelled at the storage service.

5. The system of claim 1, wherein:
  the database engine nodes are implemented as part of a database service provided by a service provider network, wherein the database service provides a plurality of databases for a plurality of different clients; and
  the storage service is provided by the service provider network.

6. A method comprising:
  performing, by a first writer to a database:
    performing respective writes to different portions of an in-memory data structure for a database that are locked to atomically complete the writes;
    sending requests to a data store that stores a copy of the in-memory data structure to perform the respective writes to the different portions in the copy;
    receiving an indication of a conflict between one of the writes and a write committed to one of the different portions of the copy of the in-memory data structure performed by a second writer to the database;
    responsive to receiving the indication of the conflict:
      sending one or more requests to cancel the respective writes to the data store;
      locking the different portions of the in-memory data structure to return the portions to a state prior to the respective writes; and
      applying the write committed to the one of the different portions of the copy of the in-memory data structure to the in-memory data structure.

7. The method of claim 6, wherein:
  the first and second writers are different database engine nodes implemented as part of a database service provided by a service provider network, wherein the database service provides a plurality of databases for a plurality of different clients; and
  the data store is implemented in a storage service provided by the service provider network.

8. The method of claim 7, wherein:
  the respective writes are directed to different pages of the database; and
  the in-memory data structure is a page cache of the database engine node, wherein the page cache includes at least a subset of pages of the database stored by the storage service.

9. The method of claim 6, wherein performing the respective writes to the different pages comprises:
  performing the writes as part of a page split operation or a page merge operation in an index of the database.

10. The method of claim 6, further comprising:
  maintaining a transaction context for the writes to the different pages, wherein the transaction context identifies the writes to the different pages and all subsequent writes generated by the first writer to the different pages; and
  cancelling the respective writes comprising causing the data store to cancel the subsequent writes to the different pages identified in the transaction context.

11. The method of claim 10, wherein cancelling the respective writes comprises:
  determining that at least one of the writes identified in the transaction context belongs to another pending transaction for another group of writes; and
  causing the data store to cancel the other group of writes.

12. The method of claim 7, wherein receiving the indication of the conflict comprises:
  receiving a replication request from another one of the database engine nodes to replicate a state of the database at the other database engine node at the database engine node;
  determining the indication of conflict based at least in part on the state of the database at the other database engine node; and
  wherein the replication request is performed after the in-memory data structure has been returned to the state prior to the respective writes.

13. The method of claim 7, wherein receiving the indication of the conflict comprises:
  reading a state of the database from the storage service;
  determining the indication of conflict based at least in part on the state of the database read from the storage service; and
  updating the in-memory data structure to reflect the state of the database read from the storage service after the in-memory data structure has been returned to the state prior to the respective writes.

14. The method of claim 7, wherein:
the storage service is a log-structured service system that stores received writes in a log; and
sending one or more requests to cancel the respective writes comprises sending the one or more requests to a programmatic interface of the log-structured storage service.

15. The method of claim 6, further comprising, performing, by the first writer:
maintaining a conflict metric that indicates an amount of write conflicts detected at the data store;
determining, based at least in part on the conflict metric, to switch to a pessimistic mode of writing the database, wherein under the pessimistic mode, writes to the database are applied to the in-memory data structure after they are determined to not conflict with other writes at the data store; and
determining, based at least in part on the conflict metric, to switch back to an optimistic mode of writing the database, wherein under the optimistic mode, writes to the database are applied to the in-memory data structure before they are determined to not conflict with other writes at the data store.

16. The method of claim 15, wherein:
the conflict metric pertains to a particular tablespace of the database or a particular database object of the database; and
maintaining the conflict metric comprises updating the conflict metric according to conflicts detected for the particular tablespace or the particular database object in a previous time period.

17. One or more non-transitory computer-accessible storage media storing program instructions that when executed on or across one or more processors implements a first writer of a plurality of writers of a database and cause the first writer to:
perform respective writes to different portions of an in-memory data structure for the database, wherein the different portions are locked to atomically complete the writes;
send requests to a data store that stores a copy of the in-memory data structure to perform the respective writes to the different portions in the copy;
receive an indication of a conflict between one of the writes and a write committed to one of the different portions of the copy of the in-memory data structure performed by a second writer to the database;
responsive to receiving the indication of the conflict:
send one or more requests to cancel the respective writes to the data store;
lock the different portions of the in-memory data structure to return the portions to a state prior to the respective writes; and
apply the write committed to the one of the different portions of the copy of the in-memory data structure to the in-memory data structure.

18. The one or more non-transitory computer-accessible storage media of claim 17, wherein to perform the respective writes to the different pages, the program instructions when executed on or across the one or more processors cause the first writer to:
perform the writes as part of a page split operation or a page merge operation on an index of the database.

19. The one or more non-transitory computer-accessible storage media of claim 17, wherein, the program instructions when executed on or across the one or more processors cause the first writer to:
maintain a transaction context for the writes to the different pages, wherein the transaction context identifies the writes to the different pages and all subsequent writes generated by the first writer to the different pages; and
cause the data store to cancel the subsequent writes to the different pages identified in the transaction context responsive to the indication of the conflict.

20. The one or more non-transitory computer-accessible storage media of claim 17, wherein the program instructions when executed on or across the one or more processors cause the one or more processors to implement a database engine node of a database service, wherein:
the first and second writers are different database engine nodes implemented as part of the database service, wherein the database service is provided by a service provider network and provides a plurality of databases for a plurality of different clients; and
the data store is implemented in a storage service provided by the service provider network.

* * * * *